US012465322B2

(12) United States Patent
Kawashima et al.

(10) Patent No.: US 12,465,322 B2
(45) Date of Patent: Nov. 11, 2025

(54) ULTRASOUND DIAGNOSTIC APPARATUS, ULTRASOUND DIAGNOSTIC SYSTEM, RECORDING MEDIUM, AND METHOD FOR ACTUATING ULTRASOUND DIAGNOSTIC APPARATUS

(71) Applicant: OLYMPUS CORPORATION, Tokyo (JP)

(72) Inventors: Tomonao Kawashima, Hachioji (JP); Shigenori Kozai, Tama (JP); Hiromasa Noguchi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 599 days.

(21) Appl. No.: 17/898,818

(22) Filed: Aug. 30, 2022

(65) Prior Publication Data

US 2022/0409168 A1 Dec. 29, 2022

Related U.S. Application Data

(63) Continuation of application No. PCT/JP2020/009480, filed on Mar. 5, 2020.

(51) Int. Cl.
*A61B 8/08* (2006.01)
*A61B 8/00* (2006.01)

(52) U.S. Cl.
CPC .............. *A61B 8/085* (2013.01); *A61B 8/463* (2013.01); *A61B 8/54* (2013.01)

(58) Field of Classification Search
CPC ......... A61B 8/085; A61B 8/54; A61B 8/4477; A61B 8/5223; A61B 8/488
See application file for complete search history.

(56) References Cited

U.S. PATENT DOCUMENTS

2015/0133783 A1 5/2015 Tabaru et al.

FOREIGN PATENT DOCUMENTS

EP 2 881 041 A1 6/2015
JP 2015-092937 A 5/2015
JP 5932183 B1 6/2016
(Continued)

OTHER PUBLICATIONS

"Streaming Detection for Evaluation of Indeterminate Sonographic Breast Masses: A Pilot Study" by M.S. Soo et al. Women's Imaging. pp. 1335-1341. 2005.*

(Continued)

*Primary Examiner* — Jason M Ip
(74) *Attorney, Agent, or Firm* — Scully, Scott, Murphy & Presser, P.C.

(57) ABSTRACT

An ultrasound diagnostic apparatus includes a drive circuit configured to transmit a drive signal to an ultrasound transducer, a receiving circuit configured to receive an echo signal from the ultrasound transducer, and a processor. The processor obtains, based on the echo signal or a user input, target information containing at least one of a distance from the ultrasound transducer to a target region containing liquid or a size of the target region, and sets, based on the target information, a drive condition under which an acoustic streaming generating ultrasound transmitted by the ultrasound transducer generates acoustic streaming in the liquid in the target region.

20 Claims, 24 Drawing Sheets

| | NEAR | FAR |
|---|---|---|
| DISTANCE (DISTANCE FROM ULTRASOUND TRANSDUCER TO CYSTIC DISEASE) | 10 OB | 10 OB |
| AMOUNT OF ATTENUATION (AMOUNT OF ATTENUATION OF ULTRASOUND BEFORE ULTRASOUND REACHES CYSTIC DISEASE) | SMALL | LARGE |
| ACOUSTIC TRANSMISSION PRESSURE (PRESSURE OF TRANSMISSION WAVE IN DISEASE) | STRONG | WEAK |
| VELOCITY OF ACOUSTIC STREAMING (IN A CASE OF SAME SIZE OF DISEASE AND SAME VISCOUS RESISTANCE) | HIGH | LOW |

(56) References Cited

FOREIGN PATENT DOCUMENTS

JP 2019-118647 A 7/2019

OTHER PUBLICATIONS

"Acoustic Streaming: An In Vitro Study" by L. Clarke et al. Ultraso. Med & Biol. vol. 30, No. 4, pp. 559-562. 2004.*

"Acoustic Streaming: Comparison of Low-amplitude Linear Model with Streaming Velocities Measured by 32-MHz Doppler" by A. Nowicki et al. Ultraso. Med. & Biol. vol. 22, No. 5, pp. 783-791, 1997.*

International Search Report dated May 26, 2020 received in PCT/JP2020/009480.

* cited by examiner

FIG. 1

| | NEOPLASTIC PANCREATIC CYST | | |
|---|---|---|---|
| | INTRADUCTAL PAPILLARY MUCINOUS NEOPLASM (IPMN) | MUCINOUS CYSTIC NEOPLASM (MCN) | SEROUS CYSTIC NEOPLASM (SCN) |
| ATTACHMENT TO PANCREATIC DUCT | PRESENT | NOT PRESENT | |
| VISCOSITY | HIGH | | LOW |
| POSSIBILITY OF BEING MALIGNANT | VARIOUS | HIGH | LOW |
| RESECTION | SURGERY IS CONSIDERED WHEN MALIGNANT SIGNS ARE OBTAINED IN INSPECTION OR WHEN THERE IS HIGH POSSIBILITY OF BEING MALIGNANT | RECOMMENDABLE | RESECTION MAY BE PERFORMED WHEN SIZE INCREASES |

FIG. 2

| DISTANCE (DISTANCE FROM ULTRASOUND TRANSDUCER TO CYSTIC DISEASE) | NEAR 10 OB | FAR 10 OB |
|---|---|---|
| AMOUNT OF ATTENUATION (AMOUNT OF ATTENUATION OF ULTRASOUND BEFORE ULTRASOUND REACHES CYSTIC DISEASE) | SMALL | LARGE |
| ACOUSTIC TRANSMISSION PRESSURE (PRESSURE OF TRANSMISSION WAVE IN DISEASE) | STRONG | WEAK |
| VELOCITY OF ACOUSTIC STREAMING (IN A CASE OF SAME SIZE OF DISEASE AND SAME VISCOUS RESISTANCE) | HIGH | LOW |

FIG. 3

| SIZE (SIZE OF CYSTIC DISEASE) | LARGE<br>US AS OB | SMALL<br>US AS OB |
|---|---|---|
| INFLUENCE OF FRICTION (IN A CASE OF SUBSTANTIALLY SIMILAR SHAPE OF CYSTIC DISEASE) | SMALL | LARGE |
| VELOCITY OF ACOUSTIC STREAMING | HIGH | LOW |

DISTANCE: 50 mm

...

DISTANCE: 15 mm

DISTANCE: 10 mm

| | DISTANCE: 5 mm | | | |
|---|---|---|---|---|
| | DIAMETER OF TARGET REGION | | | |
| FLOW VELOCITY | 5mm | 10mm | 15mm | 20mm |
| 1mm/s | 1.7mPa·s | 1.9mPa·s | 2.1mPa·s | 2.2mPa·s |
| 2mm/s | 1.9mPa·s | 2.1mPa·s | 2.3mPa·s | 2.5mPa·s |
| ... | ... | ... | ... | ... |
| 30mm/s | 4.0mPa·s | 4.5mPa·s | 4.9mPa·s | 5.2mPa·s |

ULTRASOUND DIAGNOSTIC APPARATUS, ULTRASOUND DIAGNOSTIC SYSTEM, RECORDING MEDIUM, AND METHOD FOR ACTUATING ULTRASOUND DIAGNOSTIC APPARATUS

CROSS REFERENCE TO RELATED APPLICATION

This application is a continuation application of PCT/JP2020/009480 filed on Mar. 5, 2020, the entire contents of which are incorporated herein by this reference.

BACKGROUND OF THE INVENTION

1. Field of the Invention

The present invention relates to an ultrasound diagnostic apparatus that estimates physical property values of liquid in a target region by generating acoustic streaming in the liquid, and relates to an ultrasound diagnostic system, a recording medium, and a method for actuating an ultrasound diagnostic apparatus.

2. Description of the Related Art

An ultrasound diagnostic apparatus is known that is used for determining physical properties of a target region irrespective of whether for medical purposes or non-medical purposes.

Such an ultrasound diagnostic apparatus is schematically configured as follows. The ultrasound diagnostic apparatus irradiates a target region (mainly a disease, particularly, a cystic disease) with ultrasound to apply an acoustic radiation pressure, thus generating a flow (hereinafter, referred to as "acoustic streaming") in a case where liquid is present in the target region. Then, the ultrasound diagnostic apparatus obtains ultrasound echoes from the acoustic streaming, and analyzes a flow velocity, a change in flow velocity over time or a change in flow velocity in space based on the ultrasound echoes to determine physical properties (particularly viscosity) of the target region.

Such an ultrasound apparatus is described in Japanese Patent Application Laid-Open Publication No. 2019-118647, for example. The ultrasound diagnostic apparatus transmits first ultrasound that applies an acoustic radiation force to a biological tissue and, thereafter, transmits and receives second ultrasound for detecting motion generated in the biological tissue due to the acoustic radiation force. Then, the ultrasound diagnostic apparatus calculates a plurality of parameter values indicating the magnitude of the motion generated in the biological tissue based on an echo signal from the second ultrasound at different times to distinguish between a cyst and a solid tumor and to further identify the kind of cyst according to a viscosity.

SUMMARY OF THE INVENTION

An ultrasound diagnostic apparatus according to one aspect of the present invention includes: a drive circuit configured to transmit a drive signal to an ultrasound transducer; a receiving circuit configured to receive an echo signal from the ultrasound transducer; and a processor, wherein the processor is configured to: obtain, based on the echo signal or a user input, target information containing at least one of a distance from the ultrasound transducer to a target region containing liquid or a size of the target region; and set, based on the target information, a drive condition under which a first acoustic streaming generating ultrasound transmitted by the ultrasound transducer generates acoustic streaming in the liquid in the target region.

An ultrasound diagnostic system according to another aspect of the present invention includes: an ultrasound diagnostic apparatus; and an ultrasound transducer connected to the ultrasound diagnostic apparatus, wherein the ultrasound diagnostic apparatus includes a drive circuit configured to transmit a drive signal to the ultrasound transducer, a receiving circuit configured to receive an echo signal from the ultrasound transducer, and a processor, and the processor is configured to: obtain, based on the echo signal or a user input, target information containing at least one of a distance from the ultrasound transducer to a target region containing liquid or a size of the target region; and set, based on the target information, a drive condition under which a first acoustic streaming generating ultrasound transmitted by the ultrasound transducer generates acoustic streaming in the liquid in the target region.

A recording medium according to still another aspect of the present invention is a non-transitory recording medium configured to record a processing program that causes a computer to perform processing, the non-transitory recording medium being capable of being read by the computer, wherein the recording medium records the processing program for transmitting a drive signal to an ultrasound transducer, receiving an echo signal from the ultrasound transducer, obtaining, based on the echo signal or a user input, target information containing at least one of a distance from the ultrasound transducer to a target region containing liquid or a size of the target region, and setting, based on the target information, a drive condition under which a first acoustic streaming generating ultrasound transmitted by the ultrasound transducer generates acoustic streaming in the liquid in the target region.

A method for actuating an ultrasound diagnostic apparatus according to still another aspect of the present invention includes: transmitting a drive signal to an ultrasound transducer; receiving an echo signal from the ultrasound transducer; obtaining, based on the echo signal or a user input, target information containing at least one of a distance from the ultrasound transducer to a target region containing liquid or a size of the target region; and setting, based on the target information, a drive condition under which a first acoustic streaming generating ultrasound transmitted by the ultrasound transducer generates acoustic streaming in the liquid in the target region.

BRIEF DESCRIPTION OF THE DRAWINGS

FIG. 1 is a table relating to an embodiment of the present invention and showing a relationship between a malignancy and a viscosity of liquid in a neoplastic pancreatic cyst;

FIG. 2 is a table relating to the embodiment of the present invention and showing a relationship between a distance from an ultrasound transducer to a cystic disease and a velocity of acoustic streaming generated in the liquid in the cystic disease;

FIG. 3 is a table relating to the embodiment of the present invention and showing a relationship between a size of the cystic disease and the velocity of the acoustic streaming generated in the liquid in the cystic disease;

DETAILED DESCRIPTION OF THE PREFERRED EMBODIMENTS

Figure 4:
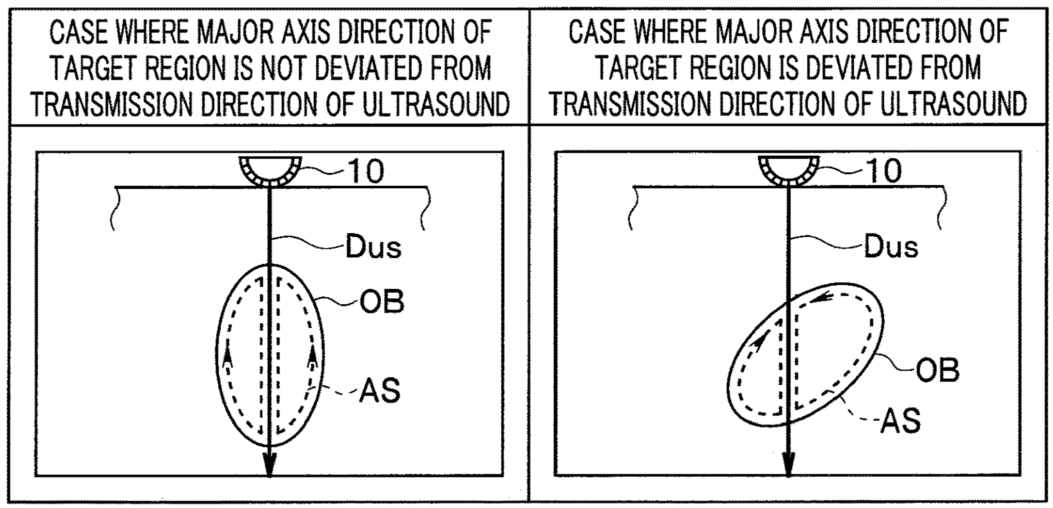
FIG. 4 is a table relating to the embodiment of the present invention and describing an example where, in a case where the cystic disease has a flattened shape, thus having a major axis direction, the velocity of the acoustic streaming generated in the liquid in the cystic disease changes due to deviation between the major axis direction and a transmission direction of ultrasound.

It is known that a disease (a cystic disease) with a sac-like cyst containing liquid occurs in the internal organ, such as the pancreas or the liver.

With regard to the pancreas, for example, a cyst formed in or around the pancreas is referred to as a pancreatic cyst, and pancreatic cysts are roughly classified as neoplastic pancreatic cyst or non-neoplastic pancreatic cyst. Of the neoplastic pancreatic and the non-neoplastic pancreatic cyst, the neoplastic pancreatic cyst is classified as an intraductal papillary mucinous neoplasm (IPMN), a mucinous cystic neoplasm (MCN), a serous cystic neoplasm (SCN), or the like. The non-neoplastic pancreatic cyst is classified as a pancreatic pseudocyst, a lymphoepithelial cyst, or the like.

It is known that a relationship between a viscosity of liquid in a neoplastic pancreatic cyst and a malignancy is as shown in FIG. 1. FIG. 1 is a table showing the relationship between a malignancy and a viscosity of liquid in a neoplastic pancreatic cyst. A viscosity of liquid increases as a content of viscous glycoprotein, which is referred to as mucin, increases.

As shown in FIG. 1, when a content is mucus-based liquid, there is a high possibility that the neoplastic pancreatic cyst is a malignant disease (a malignant tumor or the like). In contrast, when the content is serous-fluid-based liquid, there is a high possibility that the neoplastic pancreatic cyst is a benign disease. As described above, a viscosity of liquid in a cyst is one of important determinants in differentiating between a benign disease and a malignant disease.

Accordingly, if the viscosity of liquid in a cyst can be obtained with an ultrasound diagnostic apparatus, it is possible to diagnose before an operation whether resection is necessary. Further, the viscosity of liquid in a cyst is useful in diagnosing whether follow-up is necessary and in diagnosing a follow-up period.

A relative positional relationship between a disease and an ultrasound transducer provided to an ultrasound probe varies.

First, a position of a disease in the organ varies depending on a patient. To dispose the ultrasound transducer in a state of pointing in a desired direction, a space with a certain size is necessary. However, particularly, the lumen that is a target of the ultrasound endoscope is narrow and hence, a degree of freedom in arrangement is low. For this reason, it is difficult to maintain a constant relative positional relationship (orientation and depth) between the ultrasound transducer and a disease at the time of an ultrasound inspection with different patients, and such a relative positional relationship varies depending on the patient.

Further, a body posture at the time of inspection differs depending on the patient. A direction of gravity acting on a target organ or other organs differs according to a difference in body posture, for example. When the direction of gravity differs, the target organ and other organs differ in a manner of falling in the direction of gravity. Therefore, the relative positional relationship between the target organ including a disease and a skeletal structure or other organs of a patient differs. For this reason, irrespective of a fact that an operator, being a user, intends to have a position and an orientation of the ultrasound transducer same as a position and an orientation of the ultrasound transducer for another body posture, the relative positional relationship between the ultrasound transducer and the disease varies.

Next, the relative positional relationship between the ultrasound transducer and the disease varies due to movement of the operator or the patient during the ultrasound inspection.

First, when the operator gripping the ultrasound probe causes a camera-shake during the ultrasound inspection, the relative positional relationship between the ultrasound probe and the disease varies.

Further, due to motion of the organs, such as a pulse, breathing, or peristalsis of the patient, or a change in body posture during the ultrasound inspection, the relative positional relationship between the target organ including a disease and a skeletal structure or other organs of the patient differs. For this reason, irrespective of the fact that the operator intends to maintain a constant position and orientation of the ultrasound transducer, the relative positional relationship between the ultrasound transducer and the disease varies.

However, the relative positional relationship between the ultrasound transducer and cystic disease affects a velocity of acoustic streaming generated in liquid in cystic disease.

FIG. 2 is a table showing a relationship between a distance from the ultrasound transducer to a cystic disease and a velocity of acoustic streaming generated in the liquid in the cystic disease.

As shown in a distance column in FIG. 2, in a case where a distance from an ultrasound transducer 10 to a cystic disease, which is a target region OB (hereinafter referred to as "cystic disease OB" when appropriate), is relatively small, an amount of attenuation of ultrasound US (see FIG. 3 and others) transmitted from the ultrasound transducer 10 before the ultrasound US reaches the cystic disease OB is small compared with a case where the distance from the ultrasound transducer 10 to cystic disease is relatively large. As a result, a sound pressure of the ultrasound US in the cystic disease OB increases and hence, a velocity of acoustic streaming AS (see FIG. 3, FIG. 4, and others) generated in the liquid in the cystic disease OB increases. In a case where the distance from the ultrasound transducer 10 to the cystic disease OB is relatively large, a situation occurs that is opposite to the case where the distance from the ultrasound transducer 10 to the cystic disease OB is relatively small.

A size of cystic disease varies depending on the patient, and also varies depending on a kind and stage of disease, a part where the disease occurs and the like. The size of cystic disease affects a velocity of the acoustic streaming AS generated in liquid in cystic disease.

FIG. 3 is a table showing a relationship between a size of the cystic disease and the velocity of acoustic streaming generated in liquid in cystic disease.

As shown in FIG. 3, in a case of the same distance from the ultrasound transducer to the cystic disease OB, the acoustic streaming AS is less affected by friction when the cystic disease OB is relatively large than when the cystic disease OB is relatively small. As a result, when the cystic disease OB is relatively large, a velocity of the acoustic streaming AS generated in liquid in the cystic disease OB increases. When the cystic disease OB is relatively small, a situation occurs that is opposite to the case where the cystic disease OB is relatively large.

In addition to the above, in a case where the cystic disease OB does not have a spherical shape, an orientation of the cystic disease OB affects a velocity of the acoustic streaming AS generated in liquid in the cystic disease OB.

FIG. 4 is a table for describing an example where, in a case where the cystic disease has a flattened shape, thus having a major axis direction, the velocity of the acoustic streaming generated in the liquid in the cystic disease changes due to deviation between the major axis direction and a transmission direction of ultrasound.

As shown in a left column in FIG. 4, in a case where the major axis direction of the cystic disease OB is not deviated from a transmission direction Dus of ultrasound transmitted from the ultrasound transducer 10, the ultrasound is propagated in the major axis direction, so that a length of a path where the acoustic streaming AS accelerates (in other words, a path where the acoustic streaming AS is not easily affected by friction) is large and hence, a velocity of the acoustic streaming AS increases.

In contrast, as shown in a right column in FIG. 4, in a case where the major axis direction of the cystic disease OB is deviated (inclined) from the transmission direction Dus of ultrasound transmitted from the ultrasound transducer 10, a length of a path where the acoustic streaming AS accelerates is small, so that the acoustic streaming AS is significantly affected by friction and hence, a velocity of the acoustic streaming AS decreases.

As described above, the position, the size, and the orientation of the cystic disease OB vary. Accordingly, although the velocity of the acoustic streaming AS changes according to the position, size, and orientation of the cystic disease OB, it cannot be said that a difference in velocity of the acoustic streaming AS caused by the position, size, and orientation of the cystic disease OB necessarily relates to physical properties of the cystic disease OB (for example, a viscosity of liquid in the cystic disease OB).

However, according to embodiments described hereinafter, it is possible to provide an ultrasound diagnostic apparatus that can more accurately estimate physical property values of a target region based on ultrasound echoes of acoustic streaming without being affected by position, size, or orientation of the target region, and to provide an ultrasound diagnostic system, a recording medium, and a method for actuating an ultrasound diagnostic apparatus.

Hereinafter, the embodiments of the present invention will be described with reference to drawings. However, the present invention is not limited by the embodiments described hereinafter.

Note that in the drawings, identical or corresponding elements are given the same reference symbols when appropriate. The drawings are schematic views. Note that, in one drawing, a relationship of dimensions of the respective elements and a ratio between the respective elements, for example, may differ from actual ones. The relationship of dimensions and the ratio may be partially different between the plurality of drawings.

Embodiment 1

FIG. 5 to FIG. 19 are views showing embodiment 1 of the present invention.

Before the present embodiment is specifically described, a principle of measuring physical property values of liquid in a target region OB will be described.

The physical property values are basically measured as follows.

First, the target region OB is irradiated with an acoustic streaming generating ultrasound USa (see FIG. 5 and others) to generate a flow (acoustic streaming AS) in the liquid in the target region OB.

The target region OB where the acoustic streaming AS is generated is irradiated with a measuring ultrasound USb (a specific example being an ultrasound for a B mode or a Doppler mode) (see FIG. 10 and others), and then ultrasound echoes are received.

A velocity (flow velocity) of the acoustic streaming AS (or a change in velocity over time, a change in velocity in space or the like) is measured from changes in frequency, due to the Doppler effect, of the transmitted measuring ultrasound USb and the received ultrasound echoes.

By referencing a correspondence between the flow velocities obtained by measuring in advance and the viscosity coefficients (being one of physical property values, and also referred to as "shear viscosity coefficient" and hence, a term "shear viscosity coefficient" is used when appropriate), the shear viscosity coefficient of the liquid contained in the target region OB is estimated from the flow velocity.

In the present embodiment, the shear viscosity coefficient is estimated as the physical property value relating to the viscosity of the liquid. However, the physical property value relating to the viscosity of the liquid is not limited to the above, and may be a coefficient of kinematic viscosity, a coefficient of volume viscosity, or the like. Further, the physical property value estimated based on ultrasound echoes from the acoustic streaming AS is not limited to the physical property value relating to the viscosity of the liquid, and may be another physical property value.

To transmit the measuring ultrasound USb when the acoustic streaming AS is generated by the acoustic streaming generating ultrasound USa as described above, the acoustic streaming generating ultrasound USa and the measuring ultrasound USb are transmitted in parallel. In transmitting ultrasounds, the acoustic streaming generating ultrasound USa and the measuring ultrasound USb may be transmitted in parallel by simultaneously transmitting the ultrasounds, or may be transmitted in parallel by time division transmission where the acoustic streaming generating ultrasound USa and the measuring ultrasound USb are alternately transmitted. In a case of the time division transmission, the measuring ultrasound USb is transmitted within a short time interval allowing almost no decrease in flow velocity when an amount of change in flow velocity of the acoustic streaming AS is less than a threshold set in advance and the flow velocity of the acoustic streaming AS is in a stable state.

In the present embodiment, a plurality of correspondences between flow velocities and shear viscosity coefficients are prepared in advance for combinations of two parameters, that is, a distance from the ultrasound transducer 10 to the target region OB and a size of the target region OB. A physical property value of the target region OB is estimated by using the correspondence that corresponds to the target region OB, being an inspection target, and hence, it is possible to obtain the physical property value of the target region OB more accurately. In the present embodiment, functions that depend on a depth z (distance), such as a beam diameter $\phi(z)$ or a sound pressure $P(z)$ which will be described below, are used as parameters relating to a distance instead of using a distance per se.

In the present embodiment, the correspondences that correspond to the combinations of two parameters are prepared. However, correspondences that correspond to values of one parameter may be prepared. Alternatively, as shown in other embodiments which will be described later, correspondences that correspond to combinations of three parameters may be prepared, or correspondences that correspond to combinations of four or more parameters may be prepared.

In the respective embodiments, the description will be made by taking a case where the target region OB is a cystic disease (particularly, a pancreatic cyst that occurs in the pancreas) as a specific example. However, the target region OB is not limited to the above, and may be a liver cyst that occurs in the liver, may be a cyst that occurs in another organ, or may be a lesion of liquid collection, for example. Further, the target region OB is not limited to a medical target, and may be any of various sac-like objects containing liquid.

Figure 5:
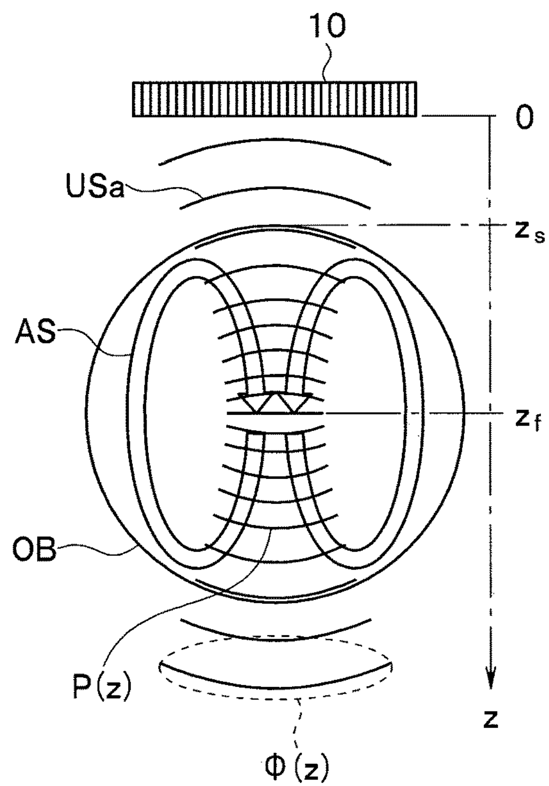
FIG. 5 is a diagram for describing a principle of measuring physical property values of a target region with an ultrasound diagnostic apparatus of embodiment 1 of the present invention.

A more detailed principle will be described with reference to FIG. 5. FIG. 5 is a diagram for describing a principle of measuring physical property values of the target region OB with an ultrasound diagnostic apparatus 5.

A z-coordinate axis is set such that a surface of the ultrasound transducer 10 is set to z=0 and a transmission direction (a direction of a sound axis) of ultrasound transmitted from the ultrasound transducer 10 is in a positive direction of z. According to such setting of coordinates, the z coordinates indicate a depth into a subject from the surface of the ultrasound transducer 10, thus being referred to as "depth z" hereinafter when appropriate.

To model the target region OB, it is assumed that the target region OB is a sphere containing liquid and having a diameter d. A depth of a boundary surface of the target region OB is taken as $z_s$, and a depth of a focal point of ultrasound is taken as $z_f$.

Physical quantities relating to ultrasound include sound pressure P(z), beam diameter ϕ(z), and center frequency $f_c$ (being a quantity corresponding to variation from a pressure (for example, from an atmospheric pressure) when a medium that transmits an acoustic wave is in an equilibrium state, and being also referred to as "sound pressure amplitude"). Of these physical quantities, the sound pressure P(z) and the beam diameter ϕ(z) change according to the depth z as shown in the table. In other words, the sound pressure P(z) and the beam diameter ϕ(z) are functions of the depth z.

In general, the center frequency $f_c$ is uniquely decided by design (a material, an external dimension, and the like) of the ultrasound transducer 10 and hence, the center frequency $f_c$ can be known from a model number or the like of an ultrasound probe 1 being used.

The beam diameter ϕ(z) is uniquely decided by a beam diameter ϕ(0) at a transmission opening on the surface of the ultrasound transducer 10 (z=0), a delay time period of pulse (further, a focal depth $z_f$ decided by the delay time period of the pulse), and the depth z, the beam diameter ϕ(0) generally having a small influence from a medium of a living body, the pulse being applied to each of a plurality of ultrasound vibration elements 10*a* (hereinafter simply referred to as "elements 10*a*") that form the ultrasound transducer 10 in a case of an array type. Therefore, after the beam diameter ϕ(0) at the transmission opening and the focal depth $z_f$ are set, a functional form of the beam diameter ϕ(z) is obtained by performing measurement in advance. Accordingly, hereinafter, the functional form of the beam diameter ϕ(z) is treated as a known functional form.

Under such a premise, drive conditions of the ultrasound transducer 10 (specifically, a delay time period for each of the plurality of elements 10*a* forming the ultrasound transducer 10) are set for which the focal depth $z_f$ is at a center of the target region OB having a spherical shape, and the target region OB is irradiated with the acoustic streaming generating ultrasound USa from the ultrasound transducer 10.

As a result of experiments and the like, it is known that the acoustic streaming AS may be more efficiently generated when the focal depth $z_f$ is set to a position somewhat close to the ultrasound transducer 10 than when the focal depth $z_f$ is caused to accurately agree with the center or a center of gravity of the target region OB. For the reason, the focal depth $z_f$ may be set to a position closer toward the ultrasound transducer 10 by a predetermined distance (predetermined distance <d/2, preferably, predetermined distance <<d/2) from the center or the center of gravity of the target region OB.

In contrast to the above, the focal depth $z_f$ from the ultrasound transducer 10 may be set to a position away from the center or the center of gravity of the target region OB by a predetermined distance (predetermined distance <d/2, preferably, predetermined distance <<d/2).

Regarding whether the focal depth $z_f$ is set to the center or the center of gravity, whether the focal depth $z_f$ is shifted from the center or the center of gravity in either of a forward direction or a rearward direction, and how the predetermined distance is set in a case of shifting the focal depth $z_f$, it is preferable to suitably determine according to a shape, arrangement, other characteristics and the like of the target region OB. One example is as follows. In a case where the target region OB has an oval shape (being a shape substantially close to a spheroid, but having a curvature on one side along an axis of rotation greater than a curvature on the other side), the focal depth $z_f$ is set to a position shifted from the center toward the side having a larger curvature, for example.

The transmitted acoustic streaming generating ultrasound USa attenuates along a transmission path. The attenuation rate varies depending on the kind of medium present along the transmission path.

Therefore, in performing irradiation with the acoustic streaming generating ultrasound USa, the operator, being a user, disposes the ultrasound transducer 10 such that a medium having extremely large reflection intensity or scattering intensity of ultrasound (bone or the like) is prevented from entering the transmission path from the ultrasound transducer 10 to the target region OB and a medium having extremely small reflection intensity or scattering intensity of ultrasound (a cyst other than the cyst being the target region OB, blood vessel, or the like) is prevented from entering the transmission path from the ultrasound transducer 10 to the target region OB.

Accordingly, in a medium in a region on the ultrasound transducer 10 side of the target region OB (z=0 to $z_s$), it can be assumed that the attenuation rate does not change, thus having a constant value. Such an attenuation rate being a constant value is taken as "ζ". Note that the attenuation rate depends on frequency of ultrasound and hence, the attenuation rate ζ being a constant value is an effective attenuation rate (an effective attenuation rate for which spectral distribution of ultrasound is taken into account), and may be an attenuation rate at the center frequency $f_c$, for example.

Assume a case where the target region OB is a cyst of a living body. In such a case, a viscosity of a medium that transmits ultrasound in the cyst variously differs according to a content of mucin or the like. However, a main component of the medium is water and hence, it can be assumed that attenuation of ultrasound is extremely small irrespective of frequency in the cyst (z=$z_s$ to ($z_s$+d)). Accordingly, the attenuation rate can be taken as zero.

A sound speed in a biological tissue is generally approximated by a sound speed in water, and the main component of the medium in the cyst is water and hence, it can be assumed that a difference in sound speed caused by a medium is negligibly small. Accordingly, the sound speed can be taken as a constant value (sound speed c).

The shear viscosity coefficient of the liquid in the cyst is taken as "η". This shear viscosity coefficient η is the physical property value of the target region OB that is currently intended to be obtained.

The acoustic streaming generating ultrasound USa transmitted from the ultrasound transducer 10 is attenuated at the attenuation rate ζ in a depth region in the range of z=0 to $z_s$ and, thereafter, causes liquid in the target region OB to vibrate in a state where the focal depth $z_f$ is set to a center $\{z_s+(d/2)\}$ of the target region OB, for example. With such an operation, the acoustic streaming AS is excited in the liquid in the target region OB and, after a certain time period, the flow velocity of the acoustic streaming AS is stabilized. The stabilized flow velocity of the acoustic streaming AS is taken as v.

The flow velocity v of the acoustic streaming AS in the target region OB is decided by physical characteristics of the target region OB and characteristics of ultrasound with which the boundary surface of the target region OB is irradiated. In the present embodiment, the physical characteristics of the target region OB are the diameter d of the target region OB having a spherical shape and the shear viscosity coefficient of liquid in the target region OB. The characteristics of ultrasound with which the boundary surface of the target region OB is irradiated are the sound pressure $P(z_s)$ and the beam diameter $\phi(z_s)$ of ultrasound that reaches the boundary surface depth $z_s$ of the target region OB. Therefore, the flow velocity v can be written by the following equation 1 as a multivariable function G that uses $P(z_s)$, $\phi(z_s)$, d, η as variables.

$$v=G(P(z_s),\phi(z_s),d,\eta) \quad \text{[Equation 1]}$$

Accordingly, by obtaining the function G, $P(z_s)$, $\phi(z_s)$, d, and v, it is possible to calculate based on the equation 1.

During manufacture, that is, before the ultrasound probe 1 and the ultrasound diagnostic apparatus 5 are shipped from a factory, the function G of the equation 1 is specifically and experimentally obtained. The function G can be obtained by repeating an experiment where the simulated ball being the model of the target region OB is irradiated with the acoustic streaming generating ultrasound USa and the flow velocity v of the generated acoustic streaming A is measured.

Specifically, the function G is obtained as follows. Plural kinds of simulated balls having different diameters d and different shear viscosity coefficients are changed in sequence with the sound pressure $P(z_s)$ of the acoustic streaming generating ultrasound USa on the boundary surface of the simulated ball being fixed to a known value. In such a state, irradiation is performed with the acoustic streaming generating ultrasound USa while the beam diameter $\phi(z_s)$ is changed, and the flow velocity v is measured each time the beam diameter $\phi(z_s)$ is changed.

Thereafter, when an ultrasound inspection is performed on the cystic disease being the target region OB in a facility, such as a hospital, the ultrasound diagnostic apparatus 5 is used in which the above-mentioned function G generated by using the simulated balls is installed and which is shipped to the facility. Specifically, the ultrasound diagnostic apparatus 5 is combined with the ultrasound probe 1, irradiates the cystic disease with the acoustic streaming generating ultrasound USa, and measures flow velocity v of the generated acoustic streaming AS. The shear viscosity coefficient η of the actual target region OB is estimated by substituting appropriate values obtained by approximating the cystic disease as a sphere and the flow velocity v into v, $P(z_s)$, $\phi(z_s)$, and d of the function G.

Unlike the simulated ball, a cystic disease does not always have a spherical shape. However, as described above, the function G is generated based on the values at the boundary surfaces of the simulated balls. In this case, when the pressure and the beam diameter of the acoustic streaming generating ultrasound USa on the boundary surface of the cystic disease are substituted into $P(z_s)$ and $\phi(z_s)$ of the function G, there is an insufficient accuracy. In view of the above, in the present embodiment, the description will be made hereinafter for an example where, more appropriate values, that is, the pressure and the beam diameter of the acoustic streaming generating ultrasound USa on the boundary surface of an approximate sphere approximating a cystic disease are substituted into $P(z_s)$ and $\phi(z_s)$ of the function G. Needless to say, a value substituted in d of the function G in this case is a diameter of the approximate sphere. Accordingly, it is possible to estimate the shear viscosity coefficient of the cystic disease more accurately.

In the present embodiment described hereinafter, a common variable $z_s$ is used for a depth of the boundary surface of the simulated ball and a depth of the boundary surface of the cystic disease. However, as described above, when the pressure $P(z_s)$ and the beam diameter $\phi(z_s)$ on the boundary surface of the cystic disease are directly substituted into the variables $P(z_s)$ and $\phi(z_s)$ of the function G, there may be some inaccuracy. Accordingly, this issue should be noted.

Provided that the type and model of the ultrasound diagnostic apparatus 5 used in the ultrasound inspection for a cystic disease in the facility is the same as the type and model of the ultrasound diagnostic apparatus 5 with which the function G is obtained by using the simulated balls during manufacture, a different machine unit may be used.

The description made heretofore is the principle of measuring the physical property values of liquid in the target region OB.

Hereinafter, the description will be made for the embodiment where the function G is obtained and a shear viscosity coefficient of a cystic disease being the actual target region OB is estimated based on the equation 1.

Figure 6:
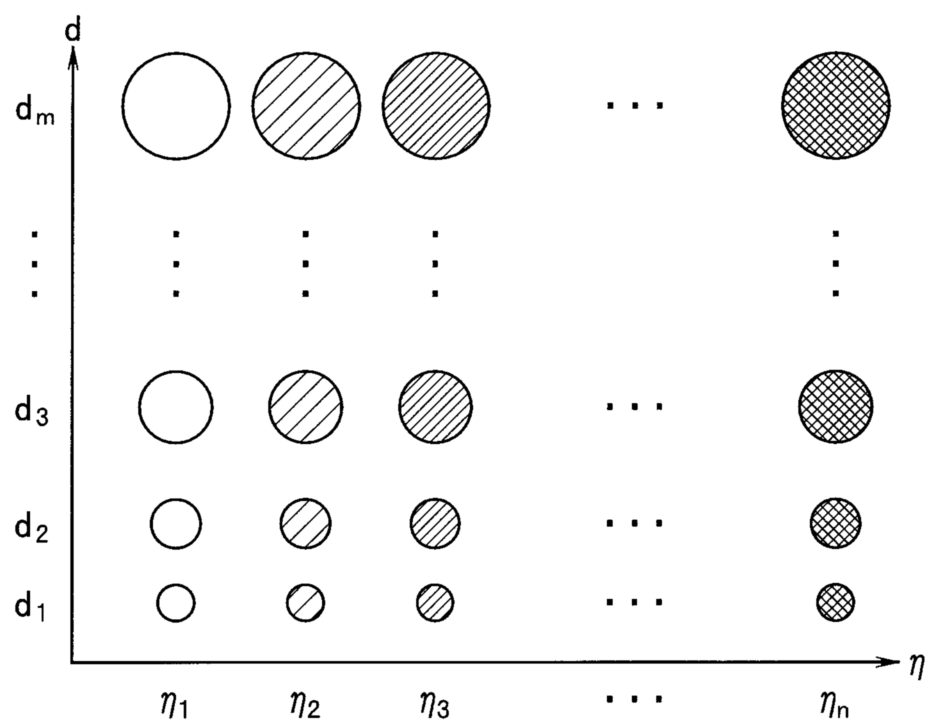
FIG. 6 is a diagram for describing an example where plural kinds of simulated balls are prepared as models of target regions to measure flow velocities of acoustic streamings corresponding to sizes and physical property values of the target regions before factory shipment in the embodiment 1.

FIG. 6 is a diagram for describing an example where plural kinds of simulated balls are prepared as models of the target regions OB to measure flow velocities v of acoustic streamings AS corresponding to sizes and physical property values of the target regions OB before factory shipment.

In the factory, a plurality of model bodies are prepared which are obtained by modelling the target regions OB and which have different sizes and different physical property values. Specifically, as the model bodies of a cystic disease, plural kinds of simulated balls are prepared, each of which contains liquid having a different shear viscosity coefficient and has a different diameter d. In the example shown in FIG. 6, m×n kinds of simulated balls are prepared in total, m×n being obtained by combining m kinds of diameters $d_1$ to $d_m$ and n kinds of shear viscosity coefficients $\eta_1$ to $\eta_n$.

Figure 7:
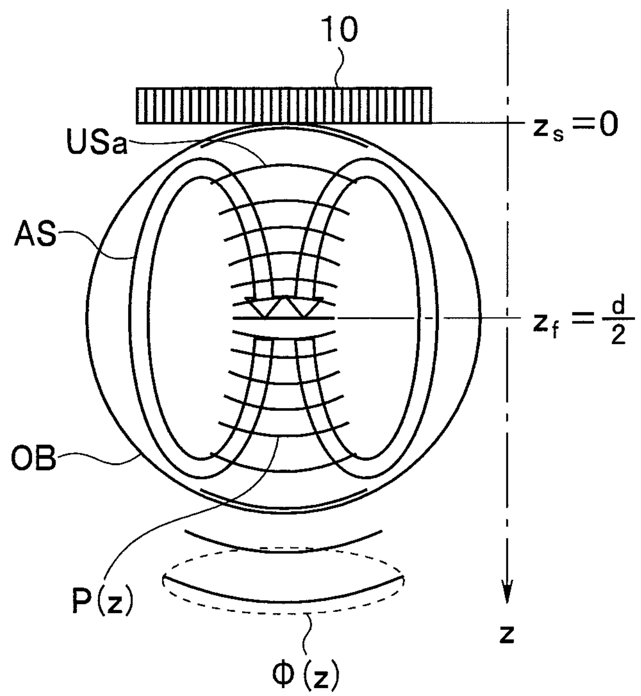
FIG. 7 is a diagram showing an example of an arrangement at a time of measuring the flow velocity of the acoustic streaming in the simulated ball in a factory in the embodiment 1.

FIG. 7 is a diagram showing an example of an arrangement at a time of measuring the flow velocity v of the acoustic streaming AS in the simulated ball in the factory.

In measuring the flow velocity v in the factory, the simulated ball is irradiated with a specific acoustic streaming generating ultrasound USa with the following irradiation conditions 1 to 3 set.

Irradiation condition 1: a focal point of an ultrasound is set to a specific position in the simulated ball, for example, set to a center ($Z_f$=d/2)

Irradiation condition 2: the ultrasound transducer 10 is caused to come into contact with the boundary surface of the simulated ball ($z_s$=0)

Irradiation condition 3: the transmission sound pressure P(0)=P($z_s$) of the ultrasound transducer 10 is set to a specific sound pressure $P_s$ which is a constant value In the irradiation condition 1, the specific position is set to the center of the simulated ball. However, as described above, the specific position may be set to the center of gravity (the simulated ball is formed to have a spherical shape and to contain uniform liquid and hence, the center of the simulated ball generally agrees with the center of gravity of the simulated ball). Alternatively, the specific position may be shifted from the center or the center of gravity by a predetermined distance.

The irradiation conditions 2 and 3 mean that a sound pressure on the boundary surface of the simulated ball is the specific sound pressure $P_s$.

The beam diameter $\phi(0)=\phi(z_s)$ that decides the transmission opening on the surface of the ultrasound transducer 10 is set to various values (for example, k kinds), and the flow velocity v of the acoustic streaming AS for each value is measured.

With such setting, the ultrasound transducer 10 is caused to come into contact with the boundary surface of the simulated ball with the simulated ball immersed into water, and the simulated ball is irradiated with the acoustic streaming generating ultrasound USa from the ultrasound transducer 10. With such operations, the acoustic streaming AS is excited in the simulated ball and, after a lapse of a certain time period, a flow velocity is stabilized. The stabilized flow velocity v is measured by Doppler mode scanning, for example.

Such measurement of the flow velocity v is performed on m×n kinds of respective simulated balls by using ultrasounds having k kinds of beam diameters $\phi(z_s)$, thus obtaining k×m×n pieces of flow velocity data.

Figure 8:
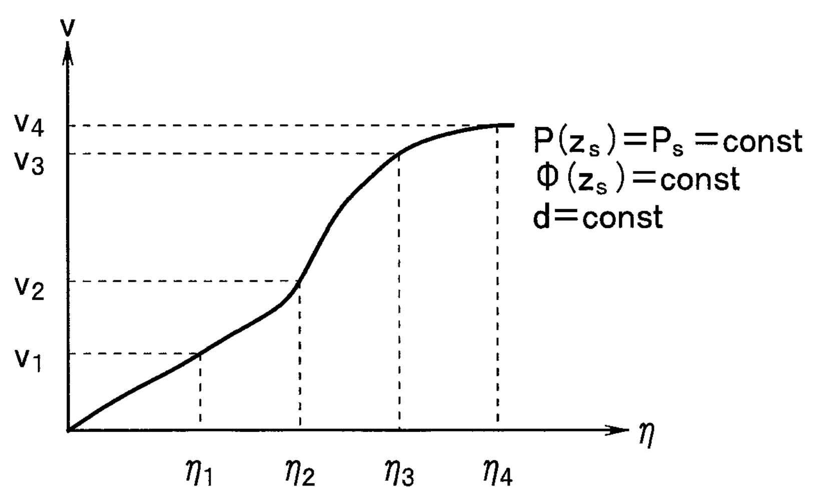
FIG. 8 is a graph showing one example of a relationship between the flow velocity of the acoustic streaming and the shear viscosity coefficient at a time of setting constant values for a sound pressure and a beam diameter on a boundary surface of the simulated ball with a specific diameter in the embodiment 1.

When an η-v curve with the specific conditions of "$P(z_s)=P_s$ (constant (const)), $\phi(z_s)$=constant, d=constant" is extracted from the flow velocity data obtained in this manner, an η-v curve shown in FIG. 8, for example, is obtained. FIG. 8 is a graph showing one example of a relationship between the flow velocity v of the acoustic streaming AS and a shear viscosity coefficient at a time of setting constant values for a sound pressure and a beam diameter on the boundary surface of the simulated ball with a specific diameter.

FIG. 8 shows the example where n=4, that is, four kinds of flow velocity data (flow velocities $v_1$ to $v_4$) that correspond to four kinds of shear viscosity coefficients $\eta_1$ to $\eta_4$ are used. Interpolation is performed between respective data by a suitable interpolation method. Flow velocity v corresponds to shear viscosity coefficient on a one-to-one basis. Therefore, when the flow velocity v is obtained, the shear viscosity coefficient with the above-mentioned specific condition is uniquely decided. In the example shown in FIG. 8, the shear viscosity coefficient monotonously increases with respect to the flow velocity v.

The curve shown in FIG. 8 shows the relationship between the flow velocity v and the shear viscosity coefficient η, and k×m number of curves are formed for combinations of k kinds of beam diameters $\phi(z_s)$ and m kinds of diameters d. Hereinafter, such data are referred to as "relationship data". This relationship data correspond to the function G shown in the equation 1, and may be used in suitable forms, such as a function (equation) or a table (reference table).

The relationship data formed as described above are stored in a storage 17, which will be described later, of the ultrasound diagnostic apparatus 5 before factory shipment.

Figure 9:
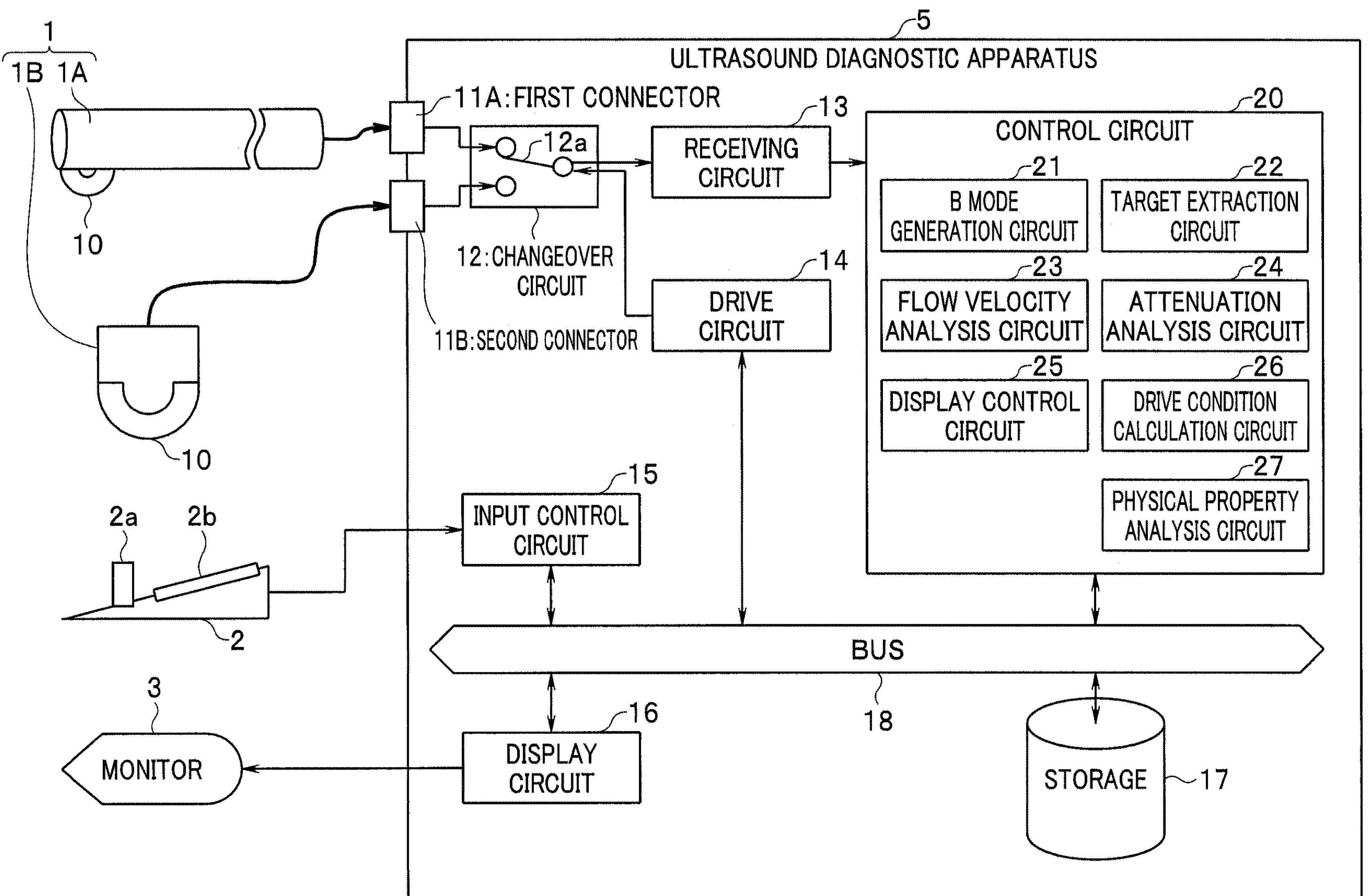
FIG. 9 is a block diagram showing a configuration of an ultrasound diagnostic system at a time of an ultrasound inspection in the embodiment 1.

FIG. 9 is a block diagram showing a configuration of an ultrasound diagnostic system at a time of the ultrasound inspection.

The ultrasound diagnostic system includes the ultrasound diagnostic apparatus 5, the ultrasound probe 1, a control panel 2, and a monitor 3.

The ultrasound probe 1 which is detachably connected to the ultrasound diagnostic apparatus 5 is an ultrasound endoscope 1A or an external ultrasound probe 1B. Either one of the ultrasound endoscope 1A or the external ultrasound probe 1B is connected to the ultrasound diagnostic apparatus 5 to be used for the ultrasound inspection.

The ultrasound endoscope 1A is an ultrasound probe that is inserted into the lumen, such as the digestive tract, to perform ultrasound scanning. The ultrasound transducer 10 is disposed at a distal end portion of an insertion portion of the ultrasound endoscope 1A. An objective lens OL is also disposed at the distal end portion of the insertion portion of the ultrasound endoscope 1A to optically observe the subject, for example (see FIG. 23 to FIG. 26 and others).

The external ultrasound probe 1B is an ultrasound probe that performs ultrasound scanning by coming into contact with a surface of the abdomen, for example. The ultrasound transducer 10 is disposed on a contact surface with the subject.

The control panel 2 is an input device operated by a user (an operator, an assistant of the operator or the like). The control panel 2 includes an irradiation start button 2*a* and a touch pad 2*b*, the irradiation start button 2*a* being provided to start irradiation with an ultrasound, the touch pad 2*b* being provided to designate the target region OB by moving an acoustic streaming generating ultrasound marker MK, which will be described later, on an ultrasound image (see FIG. 13 and others).

The monitor 3 is a display device, such as an LCD (liquid-crystal display) or an organic EL (electro-luminescence) display for displaying an ultrasound image, such as a B mode image or a Doppler image (color Doppler image).

The ultrasound diagnostic apparatus 5 includes a first connector 11A, a second connector 11B, a changeover circuit 12, a receiving circuit 13, a drive circuit 14, an input control circuit 15, a display circuit 16, the storage 17, a bus (BUS) 18, and a control circuit 20.

The first connector 11A is a connection portion for connecting the ultrasound endoscope 1A.

The second connector 11B is a connection portion for connecting the external ultrasound probe 1B.

The changeover circuit 12 includes a changeover switch 12*a* provided to change over connection of a circuit in the ultrasound diagnostic apparatus 5 between the ultrasound endoscope 1A (the first connector 11A side) and the external ultrasound probe 1B (the second connector 11B side).

The receiving circuit 13 is a circuit that receives an echo signal of an ultrasound from the ultrasound transducer 10.

The drive circuit 14 is a circuit that transmits a drive signal to the ultrasound endoscope 1A or the external ultrasound probe 1B to drive the ultrasound transducer 10. The drive circuit 14 transmits the drive signal to the ultrasound transducer 10 to cause the ultrasound transducer 10 to transmit the measuring ultrasound USb for obtaining target information and for calculating the flow velocity v of liquid.

The drive circuit 14 also transmits the drive signal to the ultrasound transducer 10 to cause the ultrasound transducer 10 to transmit the acoustic streaming generating ultrasound USa for generating acoustic streaming in liquid in the target region OB.

The input control circuit 15 is a circuit that receives an input signal from the control panel 2.

The display circuit 16 is a circuit that converts an image generated by the control circuit 20 to a signal having a system with which the signal can be outputted to the monitor 3, and the display circuit 16 then outputs the signal.

As described above, the storage 17 is a recording medium that stores the relationship data according to parameters relating to the sizes of target regions and distances, the relationship data providing the correspondence between the flow velocity v and the physical property value (for example, shear viscosity coefficient η). Specific examples of the storage 17 include an HDD (hard disk drive) and an SSD (solid state drive), for example.

The bus (BUS) 18 is a signal transmission path that are used in common by respective circuits, including the drive circuit 14, the input control circuit 15, the display circuit 16, the storage 17, and the control circuit 20, to transmit various data, a control command, or the like.

The control circuit 20 includes a B mode generation circuit 21, a target extraction circuit 22, a flow velocity analysis circuit 23, an attenuation analysis circuit 24, a display control circuit 25, a drive condition calculation circuit 26, and a physical property analysis circuit 27.

Assume that the control circuit 20 is configured such that when a processor, such as an ASIC (application specific integrated circuit) or an FPGA (field programmable gate array), that includes a CPU (central processing unit) or the like reads and executes a processing program stored in a storage device (or a recording medium), such as a memory, functions of the respective circuits are achieved. However, the configuration of the control circuit 20 is not limited to the above, and the control circuit 20 may be formed as a dedicated electronic circuit.

The B mode generation circuit 21 generates a B mode image (ultrasound image) from the echo signal obtained by causing the ultrasound transducer 10 to transmit the measuring ultrasound USb for B mode scanning.

The target extraction circuit 22 extracts a cystic disease, being the target region OB, from the B mode image generated based on the echo signal, and obtains target information containing a distance to the target region OB and a size of the target region OB. In embodiment 4, which will be described later, the target extraction circuit 22 further obtains a shape of the target region OB as target information.

The flow velocity analysis circuit 23 and the physical property analysis circuit 27 estimate physical property values of the liquid by analyzing the echo signal at a time of the acoustic streaming being generated in the liquid.

The flow velocity analysis circuit 23 calculates the flow velocity v of fluid in the target region OB by performing a Doppler analysis of the echo signal.

The attenuation analysis circuit 24 obtains an attenuation rate ζ of the medium in the subject in a region between the ultrasound transducer 10 and the target region OB (a depth region in the range of z=0 to $z_s$) by analyzing the echo signal as described later.

The display control circuit 25 causes the acoustic streaming generating ultrasound marker MK to be superposed on the B mode image at a position that corresponds to an operation signal received from the control panel 2.

Based on the above-mentioned target information, the drive condition calculation circuit 26 sets drive conditions under which the acoustic streaming generating ultrasound USa transmitted by the ultrasound transducer 10 generates acoustic streaming in the liquid in the target region OB. Specifically, the drive condition calculation circuit 26 calculates a drive condition of the ultrasound transducer 10 for which the acoustic streaming generating ultrasound USa, with which the boundary surface of the target region OB is irradiated, takes a constant value without depending on a value of the attenuation rate ζ and a depth of the target region OB (a distance from the ultrasound transducer 10 to the target region OB).

The physical property analysis circuit 27 obtains relationship data corresponding to the target information from the storage 17, and estimates physical property values by referencing the relationship data based on the flow velocity v. Specifically, the physical property analysis circuit 27 estimates the shear viscosity coefficient of the cystic disease in such a manner that the physical property analysis circuit 27 reads, from the relationship data stored in the storage 17, relationship data corresponding to the beam diameter $\phi(z_s)$ of the acoustic streaming generating ultrasound USa and the diameter d of the cystic disease approximating a sphere and, based on the flow velocity v obtained by the flow velocity analysis circuit 23, the physical property analysis circuit 27 references the curve showing the relationship between the flow velocity v and the shear viscosity coefficient the curve being shown in FIG. 8.

Hereinafter, the description will be made by taking a case where the ultrasound inspection is performed with the ultrasound endoscope 1A as an example.

Figure 10:
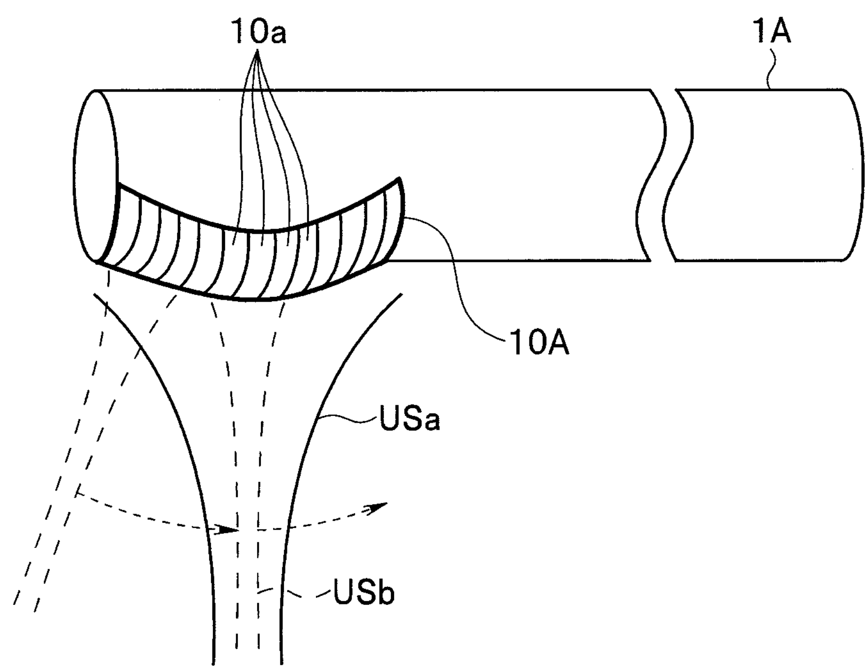
FIG. 10 is a diagram showing a constitutional example of an ultrasound transducer of an ultrasound endoscope according to the embodiment 1.

FIG. 10 is a diagram showing a constitutional example of the ultrasound transducer 10 of the ultrasound endoscope 1A.

One kind of ultrasound transducer 10 is disposed at a distal end portion of the insertion portion of the ultrasound endoscope 1A. The ultrasound transducer 10 shown in FIG. 10 is an ultrasound transducer 10A of a convex-scanning one-dimensional array type, and the plurality of elements **10*a*** are arranged in a longitudinal direction of the insertion portion to form a convex shape.

The ultrasound transducer 10 transmits two kinds of ultrasounds, that is, the acoustic streaming generating ultrasound USa and a B mode image generating ultrasound being the measuring ultrasound USb, in a time division manner.

The acoustic streaming generating ultrasound USa is transmitted as indicated by solid lines in FIG. 10 by using all elements **10*a***, and has higher intensity than the B mode image generating ultrasound (the measuring ultrasound USb). Ultrasound echoes of the acoustic streaming generating ultrasound USa are not received.

The B mode image generating ultrasound (the measuring ultrasound USb) is transmitted as indicated by dotted lines in FIG. 10 by using some elements **10*a*, for example, out of all elements 10*a* which are arranged in the ultrasound transducer 10. The B mode image generating ultrasound has lower intensity than the acoustic streaming generating ultrasound USa. When the B mode image generating ultrasound is transmitted, scanning is performed by controlling a transmission direction by changing over a group of elements used in transmission (see dotted arrows). The receiving circuit 13 receives an echo signal of the B mode image generating ultrasound from the ultrasound transducer 10, and the B mode generation circuit 21** generates a B mode image based on the echo signal obtained by the scanning.

Figure 11:
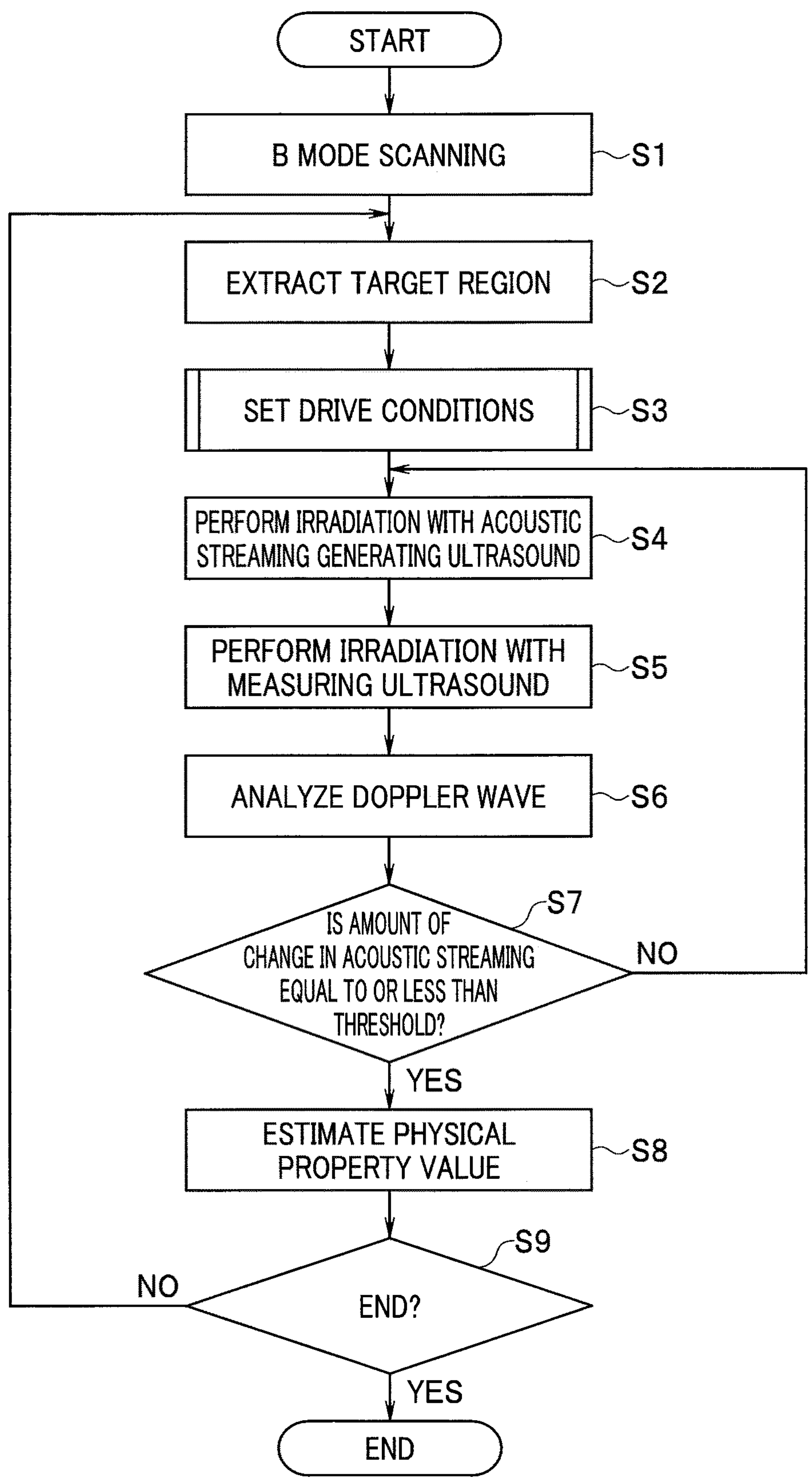
FIG. 11 is a flowchart showing processing performed when the ultrasound inspection is made with the ultrasound diagnostic system according to the embodiment 1.
Figure 12:
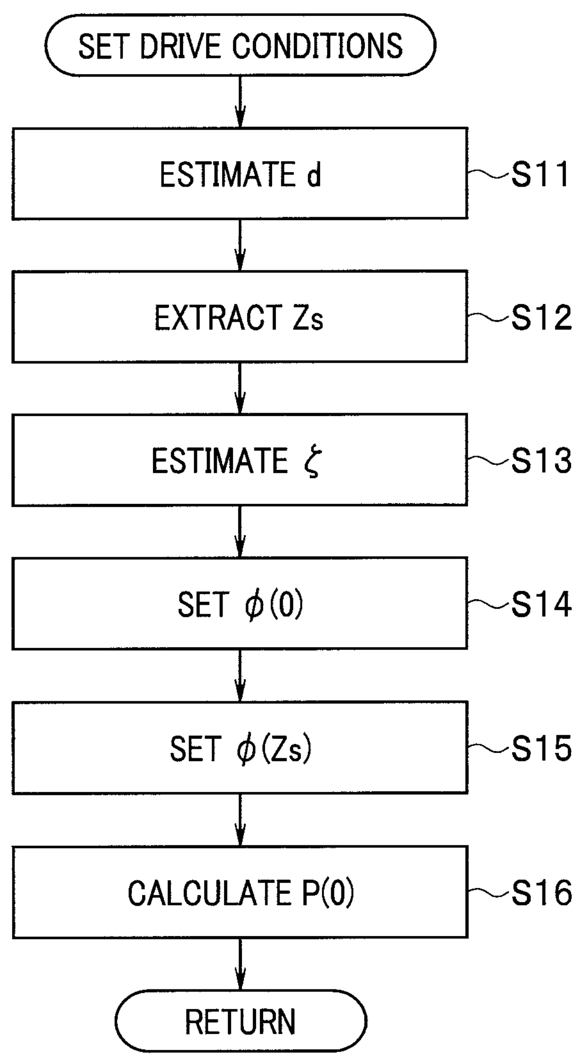
FIG. 12 is a flowchart showing a subroutine of processing of setting drive conditions shown in FIG. 11 in the embodiment 1.

FIG. 11 is a flowchart showing processing performed when the ultrasound inspection is made with the ultrasound diagnostic system. FIG. 12 is a flowchart showing a subroutine of processing of setting the drive conditions shown in FIG. 11.

Assume a case where the ultrasound diagnostic system is turned on to perform the ultrasound inspection in a facility, such as a hospital, so that a series of initialization processes is performed, thus bringing about a state waiting for an operation from the operator and, thereafter, the irradiation start button 2*a* is pressed. In such a case, an instruction to start generation of acoustic streaming is inputted into the control circuit 20 from the control panel 2 via the input control circuit 15. When the control circuit 20 receives such an instruction input, the control circuit 20 first causes processing for B mode scanning to be performed according to the control of the control circuit 20 (step S1).

In other words, the control circuit 20 controls the drive circuit 14 such that the ultrasound transducer 10 is caused to perform the B mode scanning, and the control circuit 20 receives an echo signal from the ultrasound transducer 10 via the receiving circuit 13.

Figure 13:
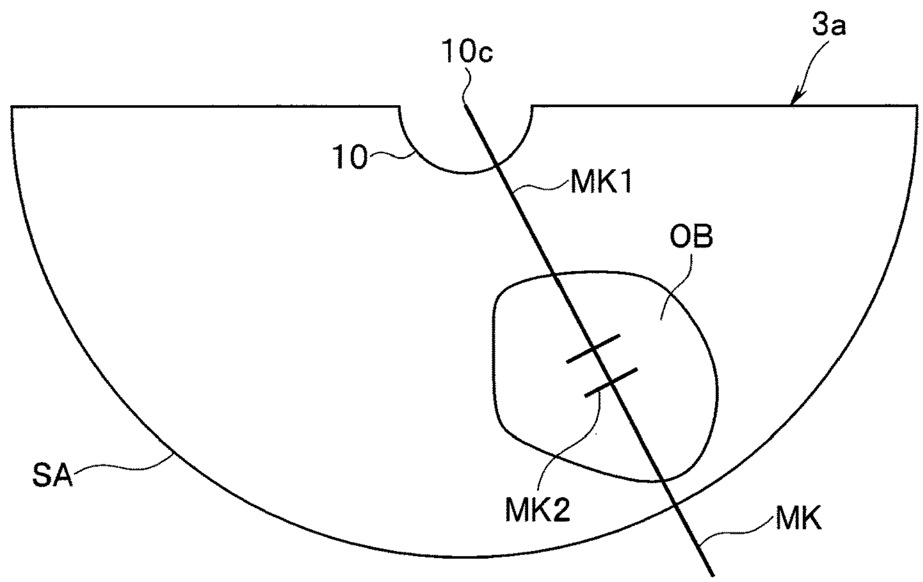
FIG. 13 is a diagram showing an example of a B mode image on which an acoustic streaming generating ultrasound marker is superposed in the embodiment 1.

The B mode generation circuit 21 performs processing of converting an amplitude of the received echo signal to a luminance signal for each scanning direction, thus forming a B mode image having a fan shape, for example, shown in FIG. 13. FIG. 13 is a diagram showing an example of the B mode image on which the acoustic streaming generating ultrasound marker MK is superposed.

The display control circuit 25 converts the B mode image to display data.

The display circuit 16 receives the display data from the display control circuit 25, and converts the display data to a signal having a format with which the signal can be inputted into the monitor 3. Then, the display circuit 16 outputs the signal to the monitor 3.

The monitor 3 displays the B mode image in response to the signal received from the display circuit 16. Therefore, if a cystic disease is present within a B mode scanning range SA (see FIG. 13 and others), the cystic disease is also depicted in the B mode image.

Next, extraction processing for the target region OB is performed (step S2).

The display control circuit 25 causes the acoustic streaming generating ultrasound marker MK as shown in FIG. 13 to be superposed on the B mode image, and the display circuit 16 causes the B mode image with the acoustic streaming generating ultrasound marker MK to be displayed on a screen 3*a* of the monitor 3. The acoustic streaming generating ultrasound marker MK is a display including a direction marker MK1 and a focal area marker MK2 (being double lines orthogonal to the direction marker MK1 in the example shown in FIG. 13). The direction marker MK1 extends in a radial direction from a center of curvature 10*c* of the ultrasound transducer 10, and indicates the transmission direction of an ultrasound, the ultrasound transducer 10 being present at a center of an upper portion of the B mode image having a fan shape, for example. The focal area marker MK2 indicates a focal area on the direction marker MK1.

Figure 14:
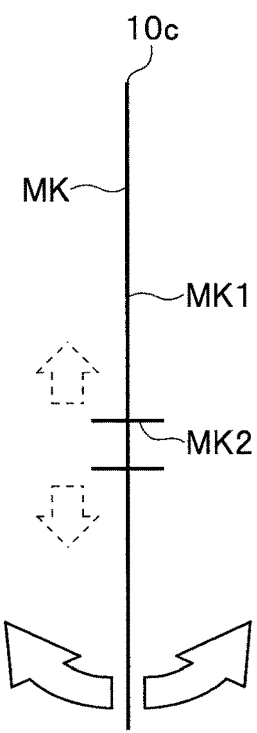
FIG. 14 is a diagram for describing an operation direction of the acoustic streaming generating ultrasound marker on the B mode image in the embodiment 1.

FIG. 14 is a diagram for describing an operation direction of the acoustic streaming generating ultrasound marker MK on the B mode image.

The direction marker MK1 can be rotated and operated about the center of curvature 10*c* (see outline arrows), and the focal area marker MK2 can be moved in the radial direction on the direction marker MK1 (see dotted line outline arrows).

The operator operates the touch pad 2*b* of the control panel 2 while observing the B mode image displayed on the screen 3*a* of the monitor 3 such that the focal area marker MK2 is located on the cystic disease intended to be set as an inspection target.

Based on the operation signal outputted from the touch pad 2*b*, the display control circuit 25 causes the acoustic streaming generating ultrasound marker MK to be superposed on the B mode image at the position designated by the operator. A specific position at which the acoustic streaming generating ultrasound marker MK should be superposed on the B mode image is a position where the direction marker MK1 passes through the cystic disease, being the target region OB, and the focal area marker MK2 is present in the cystic disease.

The display circuit 16 receives, from the display control circuit 25, display data where the acoustic streaming generating ultrasound marker MK is superposed on the B mode image. Then, the display circuit 16 converts the display data to a signal having a format with which the display data can be inputted into the monitor 3, and the display circuit 16 outputs the signal to the monitor 3.

With such operations, the cystic disease, being the target region OB, is designated on the B mode image.

In step S2, subsequently, processing of extracting a boundary of the target region OB is performed.

General biological tissues densely include cells, cell nuclei, blood vessels, and the like which are known as ultrasound scatterers. In contrast, as described above, the cystic disease contains liquid containing water as a main component, and the liquid contains almost no ultrasound scatterer. Therefore, the cystic disease has low reflectance of ultrasound, thus being displayed as a noticeable dark portion on the B mode image and hence, the cystic disease can be clearly distinguished from the biological tissue. Accordingly, the target extraction circuit 22 extracts a pixel set, where pixels having a luminance value equal to or lower than a predetermined threshold are continuously distributed, as a candidate for the target region OB (candidate region). In a case where there are a plurality of pixel sets which are continuously distributed at this point of operation, there are a plurality of candidate regions.

Further, the target extraction circuit 22 recognizes a candidate region that is superposed on the focal area marker MK2 out of one or more candidate regions as the target region OB. Then, the target extraction circuit 22 extracts a boundary of the cystic disease, being the target region OB, as indicated by a solid closed curve in FIG. 15, for example.

Thereafter, the process advances to processing of setting the drive conditions (step S3) and, as shown in FIG. 12, first, processing of estimating a diameter d of the target region OB is performed (step S11).

Figure 15:
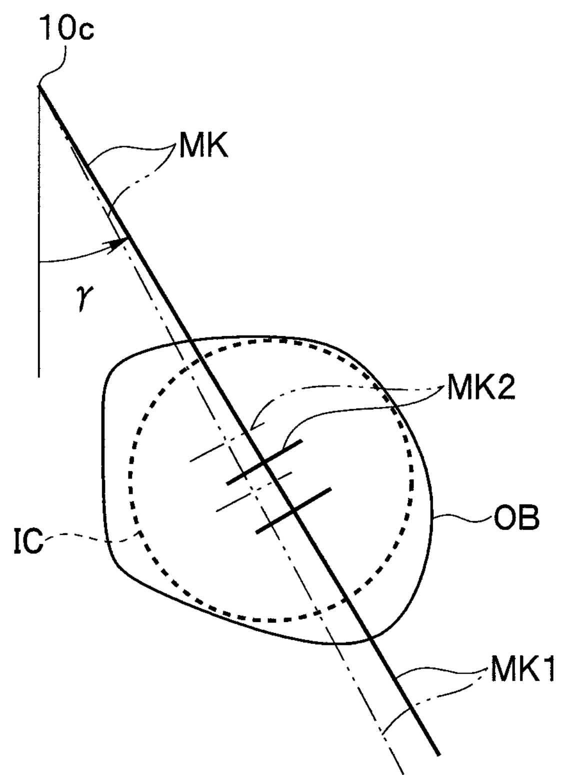
FIG. 15 is a diagram for describing an example where a maximum inscribed circle for the target region on the B mode image is calculated, and the acoustic streaming generating ultrasound marker is automatically corrected based on the maximum inscribed circle in the embodiment 1.

FIG. 15 is a diagram for describing an example where a maximum inscribed circle IC for the target region OB on the B mode image is calculated as an approximate sphere for the target region OB, and the acoustic streaming generating ultrasound marker MK is automatically corrected based on the maximum inscribed circle IC.

The target extraction circuit 22 calculates the maximum inscribed circle IC as indicated by a dotted circle in FIG. 15, and causes the target region OB to approximate the maximum inscribed circle IC, the maximum inscribed circle IC being extracted in step S2 and inscribed with the boundary of the target region OB. The target extraction circuit 22 uses a diameter of the maximum inscribed circle IC as the diameter d of the target region OB.

The target extraction circuit 22 also transmits information (the diameter d, coordinates of a center, and the like) on the calculated maximum inscribed circle IC to the display control circuit 25.

The target extraction circuit 22 transmits, to the display control circuit 25, an instruction to correct the acoustic streaming generating ultrasound marker MK such that the direction marker MK1 passes through the center of the maximum inscribed circle IC and the center of the maximum inscribed circle IC is present within the focal area marker MK2 (in an example shown in FIG. 15 and the like, the center of the maximum inscribed circle IC is located at a center of the double lines of the focal area marker MK2). The target extraction circuit 22 may further transmit an instruction to cause a marker indicating the maximum inscribed circle IC to be superposed on the B mode image to the display control circuit 25.

When the display control circuit 25 receives the instruction from the target extraction circuit 22, the display control circuit 25 causes the corrected acoustic streaming generating ultrasound marker MK (and the maximum inscribed circle IC when necessary) to be superposed on the B mode image. The automatically corrected acoustic streaming generating ultrasound marker MK (in FIG. 15, the acoustic streaming generating ultrasound marker MK before correction is made is indicated by a dashed-and-double-dotted line, and the acoustic streaming generating ultrasound marker MK after the correction is made is indicated by a solid line) and the like are superposed on the image in this manner, and such an image is displayed on the screen 3*a* of the monitor 3 through the display circuit 16.

The target extraction circuit 22 also calculates an angle $\gamma$ formed between the direction marker MK1 and a lower portion of the screen of the B mode image, and the focal depth $z_f$ which is a distance from the surface of the ultrasound transducer 10 to the center of the focal area marker MK2 on the direction marker MK1.

Next, extraction processing for the boundary surface depth $z_s$ is performed (step S12).

Figure 16:
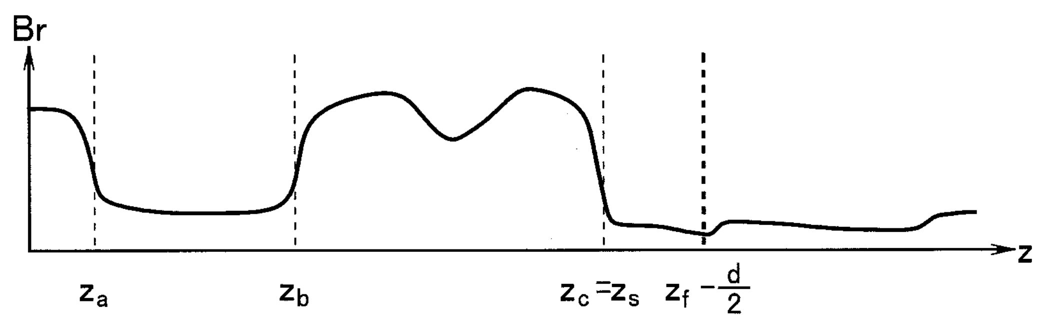
FIG. 16 is a graph showing luminance distribution of the B mode image on a direction marker extending toward a center of the maximum inscribed circle in the embodiment 1.
Figure 17:
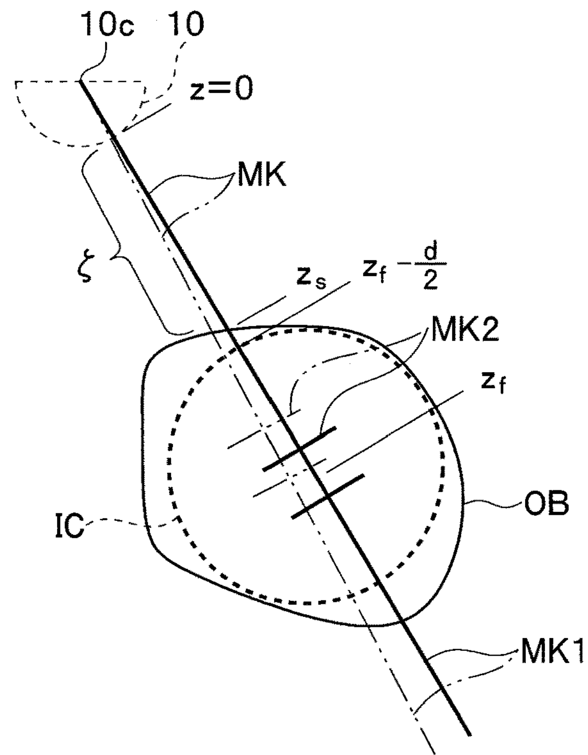
FIG. 17 is a diagram showing an example of the relationship among a depth, a boundary of the target region, the center of the maximum inscribed circle, and a boundary of the maximum inscribed circle in the embodiment 1.

The target extraction circuit 22 calculates a profile of luminance Br on the direction marker MK1 as shown in FIG. 16. FIG. 16 is a graph showing luminance distribution of the B mode image on the direction marker MK1 extending toward the center of the maximum inscribed circle IC. FIG. 17 is a diagram showing an example of a relationship among the depth, the boundary of the target region OB, the center of the maximum inscribed circle IC, and a boundary of the maximum inscribed circle IC. Processing performed in the following step will be described also with reference to FIG. 17.

The target extraction circuit 22 sets depths z as boundary surface candidate depths, an amount of change $\Delta$Br in luminance Br with respect to a certain depth $\Delta z$ exceeding a predetermined threshold at the depths z. In an example shown in FIG. 16, depths $z_a$, $z_b$, $z_c$ are the boundary surface candidate depths. Of these boundary surface candidate depths, the depth closest to the circumference (depth: $z_f-(d/2)$) on the ultrasound transducer 10 side of the center of the maximum inscribed circle IC is set as the boundary surface depth $z_s$. In the example shown in FIG. 16, the depth $z_c$ is the boundary surface depth $z_s$.

The following is a reason why the boundary surface depth $z_s$ of the actual target region OB is obtained in addition to the depth $(z_f-(d/2))$ of the circumference of the maximum inscribed circle IC approximating the target region OB as described above.

The region between $z_f-(d/2)$ and $z_s$ is within the cyst and, as described above, the main component of the medium is water and hence, an attenuation rate is substantially zero in such a region. In contrast, substantial tissue is present in a region between 0 to $z_s$ on the ultrasound transducer 10 side of the boundary surface of the actual target region OB and hence, an attenuation rate in this region significantly differs from the attenuation rate within the region ranging from $z_f-(d/2)$ to $z_s$. Accordingly, in the following step, to accurately count backward the transmission sound pressure P(0) from the ultrasound transducer 10 at which a sound pressure $P(z_f-(d/2))$ takes the specific sound pressure $P_s$, it is necessary to calculate the attenuation of the acoustic streaming generating ultrasound USa by taking into account such a significant difference in attenuation rate. For this reason, the depth $(z_f-(d/2))$ is obtained in addition to $z_s$.

Subsequently, estimation processing for the attenuation rate $\zeta$ in the region between 0 and $z_s$ is performed (step S13).

The attenuation analysis circuit 24 estimates an attenuation rate $\zeta$ [dB/MHz/cm] of ultrasound caused by tissue in the depth region in the range from the surface of the ultrasound transducer 10 (z=0) to the boundary surface depth $z_s$ by a known estimation method.

One example of the estimation method is a method described in Japanese Patent No. 5932183, for example. In the estimation method, an attenuation rate $\zeta$ is estimated as a partial differential (secondary partial derivative) with two variables of a function of spectral data, the function being a two-variable function of frequency and a reciprocating distance from the surface of the ultrasound transducer 10.

Further, processing of setting the beam diameter $\phi(0)$ at the transmission opening is performed (step S14).

The drive condition calculation circuit 26 sets some of the drive conditions of the ultrasound transducer 10 for which a minimum value of the beam diameter $\phi(z)$ takes a beam diameter $\phi(z_f)$ at the focal depth $z_f$, the beam diameter $\phi(z)$ being expressed by a function that uses the depth z as a variable. In the present embodiment, the drive conditions set by the drive condition calculation circuit 26 are the beam diameter $\phi(0)$ at the transmission opening on the surface of the ultrasound transducer 10 (z=0) and a delay time period Sti (i being element number: i=1, 2, . . . , N) of a voltage pulse applied to each element 10*a*. The drive condition calculation circuit 26 changes these drive conditions each time the focal depth $z_f$ is changed.

Thereafter, processing of setting the beam diameter $\phi(z_s)$ on the boundary surface is performed (step S15).

Although the principle of setting the beam diameter $\phi(z)$ is schematically described above, a more detailed principle of setting the beam diameter $\phi(z)$ is as follows.

The beam diameter $\phi(z)$ at the depth z is uniquely decided by the beam diameter $\phi(0)$ at the transmission opening on the surface of the ultrasound transducer 10, the delay time period $\delta t_i$ (i being an element number: i=1, 2, . . . , N) of the voltage pulse applied to each element 10*a*, and the depth z. Accordingly, the beam diameter $\phi(z)$ can be written by a multivariable function g that uses $\phi(0)$, $\{\delta t_i\}$, and z as variables. A functional form of the function g becomes known by performing measurement in advance while values of the respective variables are changed.

$$\phi(z)=g(\phi(0),\delta t_1,\delta t_2,\delta t_3, \ldots \delta t_N,z) \quad \text{[Equation 2]}$$

The delay time period {Sti} of the voltage pulse applied to each element 10*a* is uniquely decided by performing an adjustment such that the beam diameter $\phi(z_f)$ takes a minimum value at the focal depth $z_f$. Accordingly, the focal depth $z_f$ can be used as the variable in place of the delay time period $\{\delta t_i\}$ and hence, the beam diameter $\phi(z)$ at a desired depth z can be written as a multivariable function having three variables of $\phi(0)$, $z_f$, and z in the end. When this function is additionally taken as g', the equation 2 can be rewritten as shown in the following equation 3.

$$\phi(z)=g'(\phi(0),z_f,z) \quad \text{[Equation 3]}$$

Accordingly, to obtain a functional form of the function g', it is sufficient to perform measurement while changing values of three variables, that is, $\phi(0)$, $z_f$, and z. In this manner, the function g' becomes a known function before factory shipment, and is stored in the storage 17.

Accordingly, the drive condition calculation circuit 26 reads the function g' from the storage 17 and substitutes $z=z_s$ into a right side of the equation 3 to obtain the beam diameter $\phi(z_s)$ at the boundary surface depth $z_s$.

Next, processing of calculating the transmission sound pressure P(0) is performed, and a driving voltage V is set (step S16).

As described above, the relationship data stored in the storage 17 are relationship data at the time of the sound pressure on the surface of the simulated ball being the specific sound pressure $P_s$. Accordingly, in the present embodiment, the transmission sound pressure P(0) from the ultrasound transducer 10 is calculated at which a sound pressure $P(z_f-(d/2))$ of the acoustic streaming generating ultrasound USa on a circumference (depth $z=\{z_f-(d/2)\}$) of the maximum inscribed circle IC (corresponding to an approximate sphere approximating the target region OB) at the time of attenuation according to the attenuation rate $\zeta$ is equal to the specific sound pressure $P_s$. Then, a driving voltage V for the ultrasound transducer 10 is set, the driving voltage V being necessary to transmit the transmission sound pressure P(0).

The principle of calculating the transmission sound pressure P(0) based on the sound pressure $P(z_s)$ is as follows.

As described above, the sound pressure P is expressed by a two-variable function P(f, z) that depends on the frequency f and the depth z. However, in a case of the ultrasound transducer 10, as described above, the center frequency $f_c$ is uniquely decided by design (a material, an external dimension, and the like), so that a sound pressure $P(f_c, z)$ at the center frequency can be set to an effective sound pressure P(z).

First, an acoustic energy flux J of a plane wave or a spherical wave can be given by the following equation 4 based on a density $\rho$ of the medium, a sound speed c in the medium, a propagation direction $\mu$ of sound, an effective sound pressure P, and a passing area A.

$$J=\frac{P^2\cdot A}{\rho\cdot c}\cdot\cos\mu \quad \text{[Equation 4]}$$

When ultrasound having the center frequency $f_c$ is transmitted from z=0 and the acoustic energy flux J(0) of the ultrasound is transmitted through the medium having the attenuation rate $\zeta$, thus being attenuated, the acoustic energy flux J(z) at the depth z becomes as shown in the following equation 5.

$$J(z)=J(0)\cdot(10^{-\zeta\cdot f_c\cdot z})^2 \quad \text{[Equation 5]}$$

Assuming that the medium in the range of depths z=0 to $z_s$ is homogeneous ($\rho$=constant, c=constant, $\mu$=constant), the passing area A is proportional to a square of the beam diameter $\phi(z)$ and hence, the following equation 6 is derived from the equation 4 and the equation 5.

$$P^2(0)\cdot\phi^2(0)\cdot(10^{-\zeta\cdot f_c\cdot z})^2=P^2(z_s)\cdot\phi^2(z_s) \quad \text{[Equation 6]}$$

In the above-mentioned description, the sound pressure P(z) and the beam diameter $\phi(z)$ of the acoustic streaming generating ultrasound USa are taken as examples of the parameters of relationship data relating to a distance. However, as can be understood from the equation 6, intensity of the acoustic streaming generating ultrasound USa may be used in place of the sound pressure P(z), or a beam area may be used in place of the beam diameter $\phi(z)$.

When the equation 6 is rewritten to an equation that obtains the transmission sound pressure P(0), the following equation 7 is obtained.

$$P(0)=P(z_s)\cdot 10^{\zeta\cdot f_c\cdot z_s}\cdot\frac{\phi(z_s)}{\phi(0)} \quad \text{[Equation 7]}$$

Next, it can be considered that the region of the depth $z=z_s$ to $z_f-(d/2)$ is within the cyst and a main component of the medium is homogeneous. Further, the attenuation rate can be considered as zero. Accordingly, the following equation 8 is obtained in the same manner as the equation 6.

$$P^2(z_s)\cdot\phi^2(z_s)\cdot\left\{10^{-0\cdot f_c\cdot\left(z_f-\frac{d}{2}-z_s\right)}\right\}^2=P^2\left(z_f-\frac{d}{2}\right)\cdot\phi^2\left(z_f-\frac{d}{2}\right) \quad \text{[Equation 8]}$$

When the equation 8 is rewritten to an equation that obtains the sound pressure $P(z_s)$ on the boundary surface of cyst, the following equation 9 is obtained.

$$P(z_s)=P\left(z_f-\frac{d}{2}\right)\cdot\frac{\phi\left(z_f-\frac{d}{2}\right)}{\phi(z_s)} \quad \text{[Equation 9]}$$

Further, it can be assumed that a difference in sound speed caused by the medium is negligibly small between a portion in front of and a portion in rear of the boundary of the cyst and hence, the sound speed can be considered as a constant value (sound speed c). Accordingly, on the boundary of the cyst, an amount of refraction of the acoustic streaming generating ultrasound USa is small. Further, by approximating that a distance $z_f-(d/2)-z_s$ from the boundary of the cyst to the circumference of the maximum inscribed circle IC is sufficiently smaller than the distance $z_s$ from the surface of the ultrasound transducer 10 to the boundary of the cyst, the following equation 10 is obtained.

$$\phi(z_s)=\phi\left(z_f-\frac{d}{2}\right) \quad \text{[Equation 10]}$$

The following equation 11 is obtained by substituting the equation 10 into the equation 9.

$$P(z_s)=P\left(z_f-\frac{d}{2}\right) \quad \text{[Equation 11]}$$

The following equation 12 is obtained by substituting the equation 11 into the equation 7.

$$P(0) = P\left(z_f - \frac{d}{2}\right) \cdot 10^{\zeta \cdot f_c \cdot z_s} \cdot \frac{\phi(z_s)}{\phi(0)} \quad \text{[Equation 12]}$$

Based on such a principle, the drive condition calculation circuit 26 substitutes the above-mentioned known center frequency $f_c$, $P(z_f-(d/2))=P_s$ (constant value), and the respective values of $z_s$, $\phi(0)$, $\phi(z_s)$, and $\zeta$, which are obtained as described above, into the equation 12 to calculate the transmission sound pressure P(0) on the surface of the ultrasound transducer 10 (z=0).

The drive condition calculation circuit 26 further calculates a driving voltage V used for transmitting ultrasound at the obtained transmission sound pressure P(0) as shown in the following equation 13. As shown in the equation 13, the driving voltage V takes a value proportional to the transmission sound pressure P(0), and a proportional constant $\alpha$ is uniquely decided by design (a material, an external dimension, and the like) of the ultrasound transducer 10.

$$V=\alpha\times P(0) \quad \text{[Equation 13]}$$

The drive condition calculation circuit 26 sets the obtained driving voltage V, the beam diameter $\phi(0)$ at the transmission opening, and the delay time period $\{\delta t_i\}$ for each element 10*a* as the drive conditions in this manner.

Subsequently, the process returns to the processing shown in FIG. 11 from the processing shown in FIG. 12 to perform processing of performing irradiation with the acoustic streaming generating ultrasound USa (step S4)

By controlling the drive circuit 14 such that the drive signal based on the drive conditions set by the drive condition calculation circuit 26 is transmitted to the ultrasound transducer 10, the control circuit 20 causes the ultrasound transducer 10 to transmit the acoustic streaming generating ultrasound USa (continuous wave) in a transmission direction indicated by the acoustic streaming generating ultrasound marker MK.

With such operations, in the same manner as a case where irradiation is performed with the acoustic streaming generating ultrasound USa such that the specific sound pressure $P_s$ is applied to the boundary surface of the simulated ball when the flow velocity v is measured in the factory, irradiation is performed with the acoustic streaming generating ultrasound USa such that the specific sound pressure $P_s$ is applied to the circumference of the maximum inscribed circle IC (depth $z=z_f-(d/2)$), being the approximate sphere of the cystic disease, when the flow velocity v is measured in the facility, such as a hospital.

An instruction to transmit the measuring ultrasound USb to the drive circuit 14 is outputted from the control circuit 20 to cause the ultrasound transducer 10 to transmit the measuring ultrasound USb (step S5).

The ultrasound transducer 10 generates an echo signal from echoes of the measuring ultrasound USb, and then transmits the echo signal. The echo signal is inputted into the control circuit 20 via the receiving circuit 13, and is subject to Doppler analysis by the flow velocity analysis circuit 23 to calculate the flow velocity v of the acoustic streaming AS (step S6).

Specifically, the flow velocity analysis circuit 23 calculates the flow velocity v in a region indicated by the focal area marker MK2 of the acoustic streaming generating ultrasound marker MK based on a change in frequency between the transmitted measuring ultrasound USb and the received ultrasound echoes.

Thereafter, the control circuit 20 determines whether an amount of change in flow velocity v of the acoustic streaming AS is equal to or less than a predetermined threshold (step S7). Until it is determined that the amount of change in flow velocity v of the acoustic streaming AS is equal to or less than the threshold, the process returns to step S4 to perform the above-mentioned processing. The flow velocity v of the acoustic streaming AS is repeatedly calculated sequentially in this manner.

At this point of operation, the control circuit 20 may sequentially transmit, to the display control circuit 25, an instruction to display the flow velocity v, which is calculated by the flow velocity analysis circuit 23, on the screen 3*a* of the monitor 3.

When the display control circuit 25 receives the instruction from the control circuit 20, the display control circuit 25 combines text, such as a numerical value of the flow velocity v and a unit, with the B mode image. At this point of operation, the combining may be performed by causing the text to be superposed on the B mode image, or may be performed by displaying the text and the B mode image in parallel. The text, such as the numerical value indicating the value of the flow velocity v and the unit, are displayed on the screen 3*a* of the monitor 3 through the display circuit 16 in this manner.

The control circuit 20 determines whether the amount of change in flow velocity v of the acoustic streaming AS is equal to or less than the predetermined threshold as will be described below, for example. The control circuit 20 monitors the flow velocities v outputted from the flow velocity analysis circuit 23, and calculates an average value v0 of the flow velocities v within a predetermined time period (for example, ten seconds). Then, the control circuit 20 determines whether an amount of change in flow velocity v within the predetermined time period, for which the average value v0 is calculated, from the average value v0 is equal to or less than a predetermined threshold (for example, ±1 cm/second) (that is, whether the flow velocities v measured a plurality of times within the predetermined time period satisfy $\{v0-1\}\leq v\leq\{v0+1\}$).

When it is determined in step S7 that the amount of change in flow velocity v is equal to or less than the predetermined threshold, processing of estimating the shear viscosity coefficient being a physical property value, is performed (step S8).

Of relationship data stored in the storage 17, the physical property analysis circuit 27 reads relationship data corresponding to an η-v curve (see FIG. 18) that satisfies the conditions of the diameter d of the target region OB estimated in step S11 and the beam diameter $\phi(z_s)$ on the boundary surface, the beam diameter $\phi(z_s)$ being set in step S15.

Figure 18:
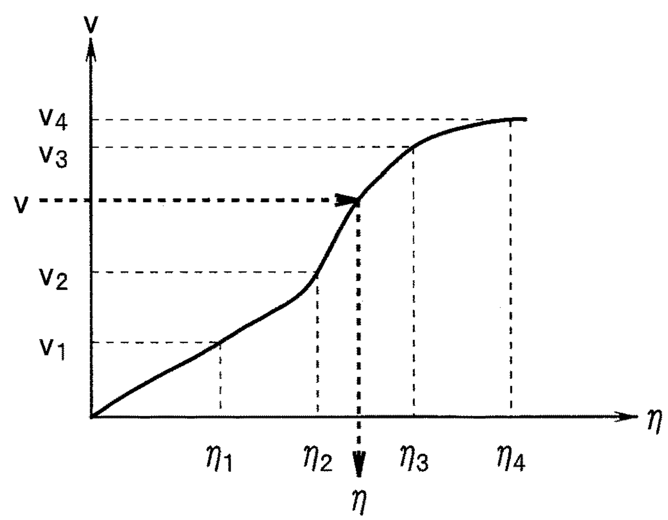
FIG. 18 is a graph showing a relationship between the flow velocity of the acoustic streaming and the shear viscosity coefficient that corresponds to a specific diameter and a specific beam diameter in the embodiment 1.

FIG. 18 is a graph showing the relationship between the flow velocity v of the acoustic streaming AS and the shear viscosity coefficient that correspond to the specific diameter d and the specific beam diameter $\phi(z_s)$.

There may be a case where the relationship data stored in the storage 17 are discrete data, such as relationship data between flow velocities $v_1$ to $v_4$ and shear viscosity coefficients $\eta_1$ to $\eta_4$. In this case, as described above, the physical property analysis circuit 27 performs processing of interpolating between dots of the discrete data with appropriate straight lines or curves.

The physical property analysis circuit 27 obtains the flow velocity v calculated by the flow velocity analysis circuit 23, and estimate the shear viscosity coefficient η corresponding to the flow velocity v from the η-v curve as indicated by arrows in FIG. 18.

Next, processing of displaying the shear viscosity coefficient being a physical property value, is performed in step S8.

The display control circuit 25 obtains the shear viscosity coefficient estimated by the physical property analysis circuit 27, and generates display data where a physical property value display 3*v* is further superposed on the B mode image on which the acoustic streaming generating ultrasound marker MK is superposed, the physical property value display 3*v* indicating the value of the shear viscosity coefficient together with mPa s (millipascal second), which is a unit.

Figure 19:
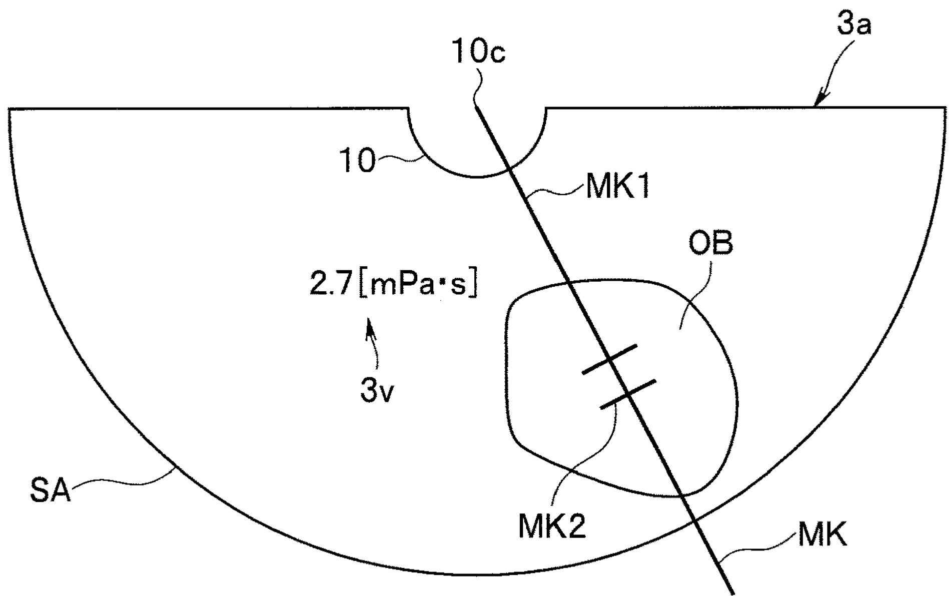
FIG. 19 is a diagram showing an example of the B mode image on which the acoustic streaming generating ultrasound marker and a physical property value display, indicating a value of the shear viscosity coefficient, are displayed in the embodiment 1.

The display circuit 16 receives, from the display control circuit 25, the display data, where the acoustic streaming generating ultrasound marker MK and the physical property value display 3*v* are superposed on the B mode image. Then, the display circuit 16 converts the display data to a signal having a format with which the signal can be inputted into the monitor 3, and the display circuit 16 outputs the signal to the monitor 3. With such operations, an ultrasound image is displayed on the screen of the monitor 3, the ultrasound image allowing the operator to check the value of the shear viscosity coefficient being a physical property value, together with the target region OB in real time. FIG. 19 is a diagram showing an example of the B mode image on which the acoustic streaming generating ultrasound marker MK and the physical property value display 3*v*, indicating the value of the shear viscosity coefficient η, are displayed. The operator can make use of the value of the shear viscosity coefficient η, which is displayed as the physical property value display 3*v* as shown in FIG. 19, as objective data used for diagnosing a malignancy of the cystic disease, whether resection is necessary, whether follow-up is necessary, and a follow-up period.

Thereafter, determination processing of determining whether the inspection is to be ended or is to be repeatedly performed is performed (step S9).

The input control circuit 15 is always in a state of accepting an instruction to stop the generation of acoustic streaming in response to the operation of the irradiation start button 2*a* performed by the operator. The control circuit 20 determines whether the input control circuit 15 is receiving the instruction to stop the generation of acoustic streaming.

When it is determined that the input control circuit 15 is not receiving the instruction to stop the generation of acoustic streaming, the process returns to step S2 and the above-mentioned processing is repeatedly performed. Accordingly, the process ranging from the extraction of the target region in step S2 to the estimation of the physical property value in step S8 is repeatedly performed at predetermined time period intervals (being a time period interval for one cycle of a loop, for example, a display frame period of the ultrasound image), and the physical property value is obtained in real time.

In contrast, when it is determined in step S9 that the input control circuit 15 is receiving the instruction to stop the generation of acoustic streaming, the control circuit 20 controls the drive circuit 14 such that an output of the measuring ultrasound USb (B mode scanning, Doppler mode scanning) and an output of the acoustic streaming generating ultrasound USa from the ultrasound transducer 10 are ended.

Thereafter, a series of end processes is performed to end the ultrasound inspection performed by the ultrasound diagnostic system.

In the embodiment 1 having such a configuration, the drive conditions of the ultrasound transducer 10 are set based on target information containing a distance to the target region OB. Accordingly, even when the distance to the target region OB changes, it is possible to stably generate acoustic streaming in liquid contained in the target region OB and hence, physical property values of the liquid can be estimated more accurately.

At this point of operation, by setting the drive conditions under which the boundary surface of the target region OB is irradiated with a constant acoustic streaming generating ultrasound USa even when the distance to the target region OB changes, it is possible to make a comparison of flow velocities v of acoustic streamings generated in the target regions OB with the same conditions. Accordingly, it is possible to estimate the physical property values more accurately.

By calculating the flow velocity v of acoustic streaming by analyzing an echo signal, it is possible to estimate a physical property value (a shear viscosity coefficient, a coefficient of kinematic viscosity, a coefficient of volume viscosity, or the like) relating to viscosity having a high correlation with the flow velocity v.

Further, relationship data are stored in advance in the storage 17 according to the sizes of the target regions OB and parameters relating to the distances. With such a configuration, by reading the relationship data corresponding to target information, it is possible to accurately estimate physical property values without being affected by the size of the target region OB and the distance to the target region OB.

At this point of operation, even in a case where the flow velocity v of acoustic streaming with a different time period is measured in the same manner as the above-mentioned Japanese Patent Application Laid-Open Publication No. 2019-118647, an objective flow velocity v can be obtained with the same measurement conditions without being affected by the size of the target region OB and without being affected by the distance to the target region OB that may differ with a different time period. Accordingly, it is possible to accurately estimate physical property values.

The drive conditions are set for which the boundary surface of the target region OB is irradiated with the acoustic streaming generating ultrasound USa that agrees with the specific acoustic streaming generating ultrasound USa with which the boundary surface of the model body is irradiated at the time of measuring relationship data. Accordingly, it is possible to reference the relationship data based on the flow velocity v obtained with the same conditions as when the relationship data are obtained.

The parameters relating to the distance include at least one of "a sound pressure or an intensity" or "a beam diameter or a beam area". Therefore, even in the case where it is impossible to always maintain a constant sound pressure or a constant intensity (a constant beam diameter or a constant beam area) of the acoustic streaming generating ultrasound USa with which the boundary surface of the target region OB is irradiated, it is possible to accurately estimate physical property values by using the relationship data that correspond to the parameter.

For example, assume a case where relationship data are obtained by performing irradiation with the acoustic streaming generating ultrasound USa such that the sound pressure on the boundary surface of the model body is the specific sound pressure. In such a case, by setting the drive conditions under which the sound pressure of the acoustic streaming generating ultrasound USa on the boundary surface of an approximate shape (the approximate sphere in the above-mentioned description) for the target region OB is equal to the specific sound pressure, it is possible to generate acoustic streaming in the target region OB with the sound pressure the same as the sound pressure applied to the model body, so that the flow velocity v can be measured.

At this point of operation, by estimating the attenuation rate of the acoustic streaming generating ultrasound USa within a range from the surface of the ultrasound transducer 10 to the boundary surface of the target region OB, it is possible to understand how the acoustic streaming generating ultrasound USa attenuates and reaches the target region OB. Accordingly, it is possible to accurately calculate a transmission sound pressure from the ultrasound transducer 10, the transmission sound pressure being required for irradiating the boundary surface of the target region OB with the acoustic streaming generating ultrasound USa at a specific sound pressure.

By transmitting the measuring ultrasound USb for B mode scanning or Doppler mode scanning, it is possible to obtain target information based on echo signals relating to the measuring ultrasound USb, so that it is possible to calculate the flow velocity v of liquid.

Further, a configuration is adopted where the target region OB is automatically extracted in real time and the drive conditions are set in real time. With such a configuration, even in a case where a position of the target region OB that faces the ultrasound transducer 10 changes due to a shake of the ultrasound probe 1 or body movement during the ultrasound inspection, the target region OB is automatically tracked and the target region OB is irradiated with the same acoustic streaming generating ultrasound USa. Accordingly, it is possible to accurately measure physical property values always.

By performing time division transmission, it is possible to transmit the measuring ultrasound USb and the acoustic streaming generating ultrasound USa with one ultrasound transducer 10. Accordingly, it is possible to reduce a diameter of the distal end portion of the insertion portion of the ultrasound endoscope 1A, for example.

The marker, indicating the transmission direction of the acoustic streaming generating ultrasound USa and the focal area, is superposed on an ultrasound image and hence, the operator can designate the target region OB with high operability by using the control panel 2 while observing the ultrasound image.

The physical property values are accurately estimated in this manner. Accordingly, it is possible to quantitatively evaluate the physical property values indicating properties of tissue of the cystic disease and hence, it is possible to make a qualitative diagnosis of the cystic disease more accurately.

By causing the physical property value to be superposed on the ultrasound image, the physical property value can be checked together with the target region OB in real time.

In the above-mentioned description, a sphere is used as the model body of the target region OB. However, any of solids other than the sphere, such as an ellipsoid, a spheroid, a cube, a rectangular parallelepiped shape, or the above-mentioned oval shape, may be used as the model body. In a case where a cube or a rectangular parallelepiped shape is used as the model body, a point of intersection between diagonals may be set at the focal point of the acoustic streaming generating ultrasound USa. A case where an ellipsoid or a spheroid out of the solids is used as the model body will be described in the embodiment 4 later.

In the above-mentioned description, a cyst, which is the target region OB in the facility, is approximated as a sphere, and the focal depth $z_f$ is set to be at the center or in front or rear of the center of the target region OB. However, the cyst may be approximated as any of other solids, such as an ellipsoid, a spheroid, a cube, a rectangular parallelepiped shape, or the above-mentioned oval shape.

In a case where the cyst is approximated as a sphere, the center agrees with the center of gravity. However, in a case where the cyst is approximated as a solid with the center not agreeing with the center of gravity, the focal depth $z_f$ may be set to the center of gravity of or around the center of gravity of the target region OB. In other words, a position at which the focal depth $z_f$ is set is not limited to the center of or around the center of the target region OB. The position of the center of gravity may be decided from a profile of the target region OB, for example.

In the above-mentioned description, the relationship data are obtained in the factory by performing irradiation with the acoustic streaming generating ultrasound USa such that the sound pressure on the boundary surface of the model body, being the sphere, is the specific sound pressure and hence, in the facility, drive conditions are set for which the sound pressure of the acoustic streaming generating ultrasound USa on the boundary surface of the approximate sphere for the target region OB is equal to the specific sound pressure. However, in a case where the target region OB has a shape close to a sphere when the subject is actually observed in the facility (hospital), drive conditions may be set for which not the sound pressure of the acoustic streaming generating ultrasound USa on the boundary surface of the approximate sphere (depth $z=z_f-(d/2)$) but the sound pressure of the acoustic streaming generating ultrasound USa on the boundary surface of the target region OB per se (depth $z=z_s$) is equal to the specific sound pressure.

In the above-mentioned description, the diameter d of the target region OB is used as the parameter which indicates the size of the target region OB. However, the parameter is not limited to the above, and a radius, a volume, or a cross-sectional area of the target region OB, for example, may be suitably used as a parameter.

In the above-mentioned description, the irradiation conditions 2 and 3 at the time of measuring the flow velocity v of the acoustic streaming AS in the factory are set as follows.

Irradiation condition 2: the ultrasound transducer 10 is caused to come into contact with the boundary surface of the simulated ball ($z_s=0$)

Irradiation condition 3: the transmission sound pressure $P(0)=P(z_s)$ of the ultrasound transducer 10 is set to the specific sound pressure $P_s$, which is a constant value In such a state, the beam diameter $\phi(0)=\phi(z_s)$ that decides the transmission opening is set to various values, and the flow velocity v of the acoustic streaming AS is measured.

However, the irradiation conditions are not limited to the above. Another irradiation condition 3' may be set while the irradiation condition 2 is maintained without any change.

Irradiation condition 2: the ultrasound transducer 10 is caused to come into contact with the boundary surface of the simulated ball ($z_s=0$)

Irradiation condition 3': the beam diameter $\phi(0)=\phi(z_s)$ at the transmission opening of the ultrasound transducer 10 is set to the specific diameter $\phi_s$, which is a constant value In such a state, the transmission sound pressure $P(0)=P(z_s)$ may be set to various values, and the flow velocity v of the acoustic streaming AS may be measured.

With such a configuration, the relationship data stored in the storage 17 are data measured in such a manner that a specific position (the center, the center of gravity, or around the center or the center of gravity) in the model body is set as the focal point, and the model body is irradiated with the specific acoustic streaming generating ultrasound USa while the sound pressure $P(z_s)$ is changed, the beam diameter $\phi(z_s)$ of the specific acoustic streaming generating ultrasound USa on the boundary surface of the model body being the specific diameter $\phi_s$.

In a case where the irradiation condition 3' is used, it is unnecessary to change an opening diameter to be other than $\phi_s$ and hence, it is possible to adopt a configuration where a single plate transducer (not being of an array type, but being the ultrasound transducer 10 formed of one ultrasound vibration element) is used as the ultrasound transducer 10 for generating acoustic streaming, the single plate transducer being separated from the ultrasound transducer 10 for B mode scanning and having a fixed opening diameter. Such a single plate transducer has a high efficiency of converting electrical energy to acoustic energy and hence, a large output of the acoustic streaming generating ultrasound USa can be achieved.

In such a case, the drive conditions of the single plate transducer are conditions under which the beam diameter $\phi(z_s)$ of the acoustic streaming generating ultrasound USa on the boundary surface of the target region OB is equal to the specific diameter Os. Accordingly, it is preferable to use a single plate transducer which is designed such that the beam diameter $\phi(z)$ is maintained at a substantially constant value within a range of a practical depth z even when the depth z changes.

As described above, in a case where relationship data are obtained by performing irradiation with the acoustic streaming generating ultrasound USa such that the beam diameter on the boundary surface of the model body is the specific diameter, by setting drive conditions under which the beam diameter of the acoustic streaming generating ultrasound USa on the boundary surface of the target region OB is equal to the specific diameter, it is possible to generate acoustic streaming in the target region OB with the beam diameter equal to the beam diameter of the model body to measure a flow velocity v.

Figure 20:
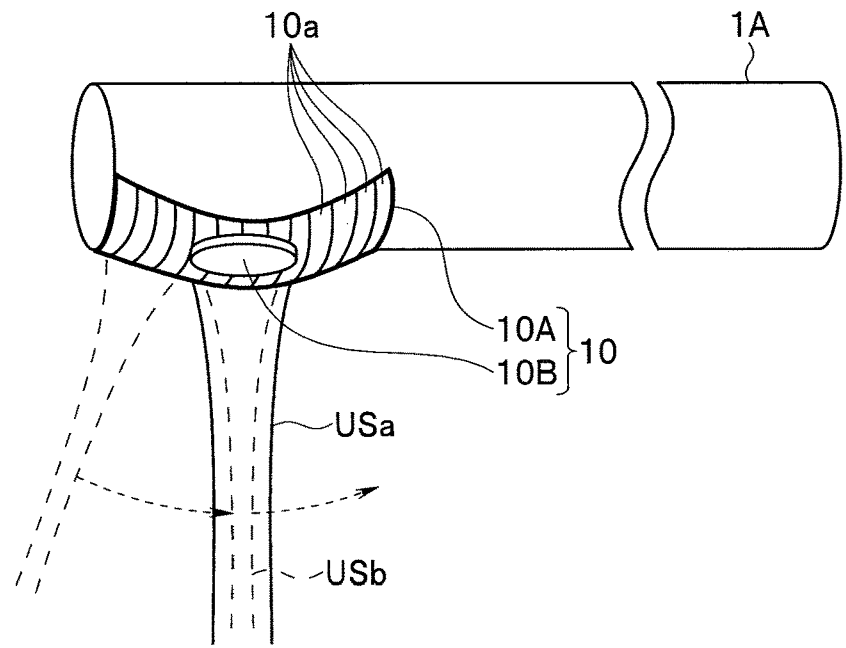
FIG. 20 is a diagram showing a constitutional example of an ultrasound transducer of an ultrasound endoscope according to a first modification of the embodiment 1.

FIG. 20 is a diagram showing a constitutional example of the ultrasound transducer 10 of the ultrasound endoscope 1A according to a first modification of the embodiment 1.

The ultrasound transducer 10 shown in FIG. 20 further includes a single plate transducer 10B in addition to the ultrasound transducer 10A of a convex-scanning one-dimensional array type shown in FIG. 10. The single plate transducer 10B is disposed at a center portion of the ultrasound transducer 10A of a convex-scanning one-dimensional array type.

In the ultrasound endoscope 1A having such a configuration, the ultrasound transducer 10A of a convex-scanning one-dimensional array type, being a first ultrasound transducer, transmits a B mode image generating ultrasound (or ultrasound for Doppler mode scanning) (hereinafter the same applies), being the measuring ultrasound USb, and the single plate transducer 10B, being a second ultrasound transducer, transmits the acoustic streaming generating ultrasound USa. In the configuration of the first modification of the embodiment 1, it is possible to simultaneously transmit two kinds of ultrasounds, that is, the acoustic streaming generating ultrasound USa and the measuring ultrasound USb (It is also possible to transmit the two kinds of ultrasounds in a time division manner. However, to prevent the acoustic streaming AS from being attenuated, it is preferable to transmit the two kinds of ultrasounds simultaneously).

As described above, the single plate transducer 10B has higher efficiency of converting electrical energy to acoustic energy than the ultrasound transducer 10 for B mode scanning. Accordingly, although the single plate transducer 10B has a smaller diameter than the ultrasound transducer 10A of a convex-scanning one-dimensional array type, the single plate transducer 10B can achieve a large output of the acoustic streaming generating ultrasound USa. In such a case, a larger output can be obtained by increasing the driving voltage V applied to the single plate transducer 10B.

Relationship data between the flow velocity v of the acoustic streaming AS and the shear viscosity coefficient is stored in the storage 17 of the ultrasound diagnostic apparatus 5, the relationship data being measured in the factory by setting the transmission sound pressure $P(0)=P(z_s)$ to various values with irradiation conditions 1, 2, and 3' in which the beam diameter $\phi(0)=o(z_s)$ at the transmission opening of the ultrasound transducer 10 is set to the specific diameter $\phi_s$ (diameter of the single plate transducer 10B), which is a constant value.

Specifically, FIG. 8 shows the curve showing the relationship between the flow velocity v and the shear viscosity coefficient and, in the factory, j×m number of curves are formed for combinations of j kinds of transmission sound pressures $P(0)=P(z_s)$ and m kinds of diameters d. The j×m number of curves are stored in the storage 17 as relationship data.

Accordingly, the ultrasound diagnostic apparatus 5 performs processing of estimating the sound pressure $P(z_s)$ at the boundary surface depth $z_s$ and then estimating the shear viscosity coefficient from the flow velocity v based on the curve shown in FIG. 8 that corresponds to the combination of the estimated sound pressure $P(z_s)$ and the diameter d of the target region OB estimated in the processing in step S11 shown in FIG. 12.

The ultrasound endoscope 1A of the first modification of the embodiment 1 adopts the configuration where the measuring ultrasound USb is transmitted by the first ultrasound transducer and the acoustic streaming generating ultrasound USa is transmitted by the second ultrasound transducer and hence, it is possible to transmit the measuring ultrasound USb and the acoustic streaming generating ultrasound USa simultaneously. When two kinds of ultrasounds are transmitted in a time division manner, attenuation somewhat occurs in acoustic streaming. However, in the first modification where simultaneous transmission is performed, it is possible to measure a flow velocity v of acoustic streaming where such attenuation does not occur.

Further, the single plate transducer 10B with a large output is provided and hence, it is possible to increase a sound pressure in the target region OB. Accordingly, it is possible to stably excite an acoustic streaming AS.

Therefore, it is possible to more accurately estimate the shear viscosity coefficient η based on the flow velocity v of stable acoustic streaming AS having no attenuation.

The single plate transducer 10B is used in the first modification of the embodiment 1. However, the single plate transducer 10B may be replaced by an annular array ultrasound transducer. The annular array ultrasound transducer is formed of a plurality of divided ultrasound vibration elements having concentric ring shapes. By driving the respective ultrasound vibration elements with respective delays, it is possible to change a focal point as necessary.

Figure 21:
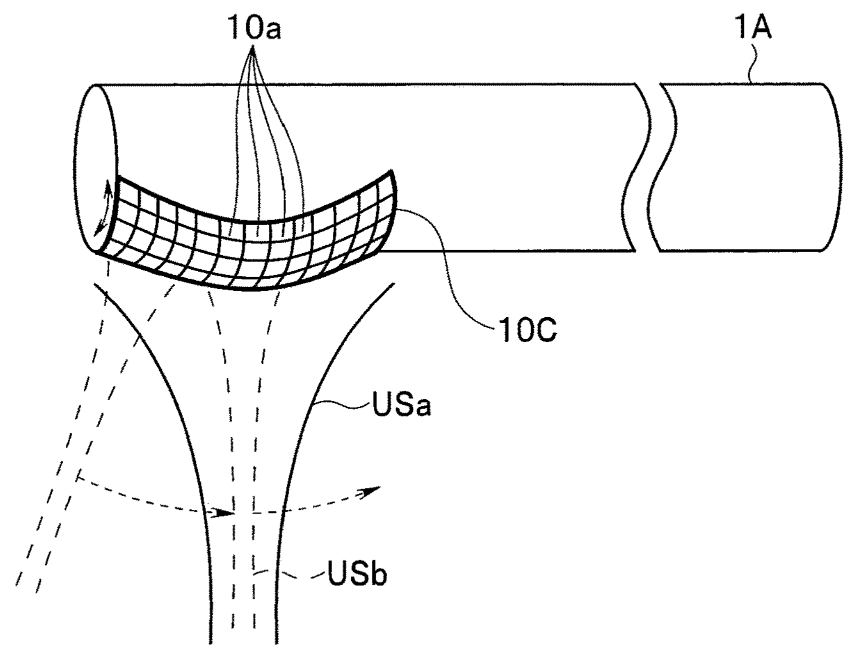
FIG. 21 is a diagram showing a constitutional example of an ultrasound transducer of an ultrasound endoscope according to a second modification of the embodiment 1.

FIG. 21 is a diagram showing a constitutional example of the ultrasound transducer 10C of the ultrasound endoscope 1A according to a second modification of the embodiment 1.

The ultrasound transducer 10A of the above-mentioned embodiment 1 shown in FIG. 10 is of a convex-scanning one-dimensional array type where the elements 10*a* are arranged one-dimensionally in a direction of an insertion axis. In contrast, an ultrasound transducer 10C shown in FIG. 21 is of a convex-scanning two-dimensional array type where the elements 10*a* are arranged two-dimensionally in a direction of the insertion axis and a direction around the insertion axis.

Also in a case where the ultrasound transducer 10C having such a configuration is used, in the same manner as the above, two kinds of ultrasounds, that is, the acoustic streaming generating ultrasound USa and the measuring ultrasound USb, are transmitted from one ultrasound transducer 10C in a time division manner.

Further, in the same manner as the above, the acoustic streaming generating ultrasound USa is transmitted by using all elements 10*a* and has higher intensity than the measuring ultrasound USb, and ultrasound echoes of the acoustic streaming generating ultrasound USa are not received.

In the same manner as the above, the measuring ultrasound USb is transmitted by using some elements 10*a* out of all elements 10*a* arranged in the ultrasound transducer 10C, and has lower intensity than the acoustic streaming generating ultrasound USa. Further, scanning is performed by controlling the transmission direction by changing over a group of elements used in transmission (see dotted arrow), and the B mode generation circuit 21 generates a B mode image when the B mode generation circuit 21 receives ultrasound echoes.

When the ultrasound endoscope 1A of a convex-scanning two-dimensional array type of the second modification of the embodiment 1 is used, it is possible to obtain advantageous effects substantially equal to the advantageous effects of the embodiment 1.

In addition to the above, both of the acoustic streaming generating ultrasound USa and the measuring ultrasound USb can also be focused in an elevation direction (a direction about the insertion axis indicated by a solid double-headed arrow). It is also possible to control the beam diameter $\phi(z)$ of ultrasound in a direction parallel to the insertion axis.

Figure 22:
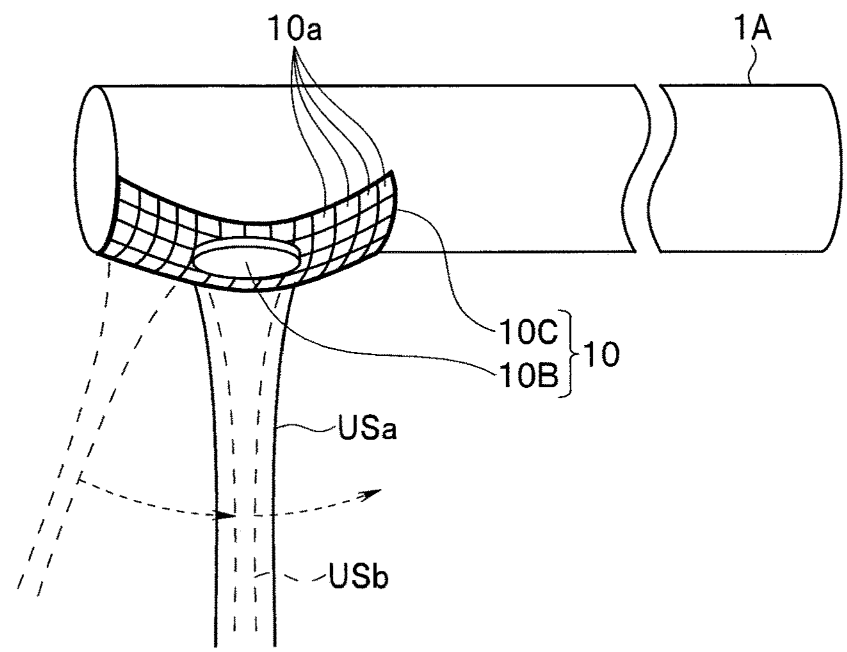
FIG. 22 is a diagram showing a constitutional example of an ultrasound transducer of an ultrasound endoscope according to a third modification of the embodiment 1.

FIG. 22 is a diagram showing a constitutional example of the ultrasound transducer 10 of the ultrasound endoscope 1A according to a third modification of the embodiment 1.

The ultrasound transducer 10 shown in FIG. 22 has a configuration where the ultrasound transducer 10A of a convex-scanning one-dimensional array type of the ultrasound transducer 10 shown in FIG. 20 is replaced by the ultrasound transducer 10C of a convex-scanning two-dimensional array type shown in FIG. 21. In the same manner as the configuration shown in FIG. 20, the single plate transducer 10B is disposed at a center portion of the ultrasound transducer 10C of a convex-scanning two-dimensional array type.

Accordingly, when the ultrasound endoscope 1A of a convex-scanning two-dimensional array type of the third modification of the embodiment 1 is used, it is possible to obtain advantageous effects substantially equal to the advantageous effects of the first modification of the embodiment 1. In addition to the above, the measuring ultrasound USb can also be focused in the elevation direction.

The single plate transducer 10B is used in the third modification of the embodiment 1. However, the single plate transducer 10B may be replaced by an annular array ultrasound transducer. The annular array ultrasound transducer is formed of a plurality of divided ultrasound vibration elements having concentric ring shapes. By driving the respective ultrasound vibration elements with respective delays, it is possible to change a focal point as necessary.

Embodiment 2

Figure 23:
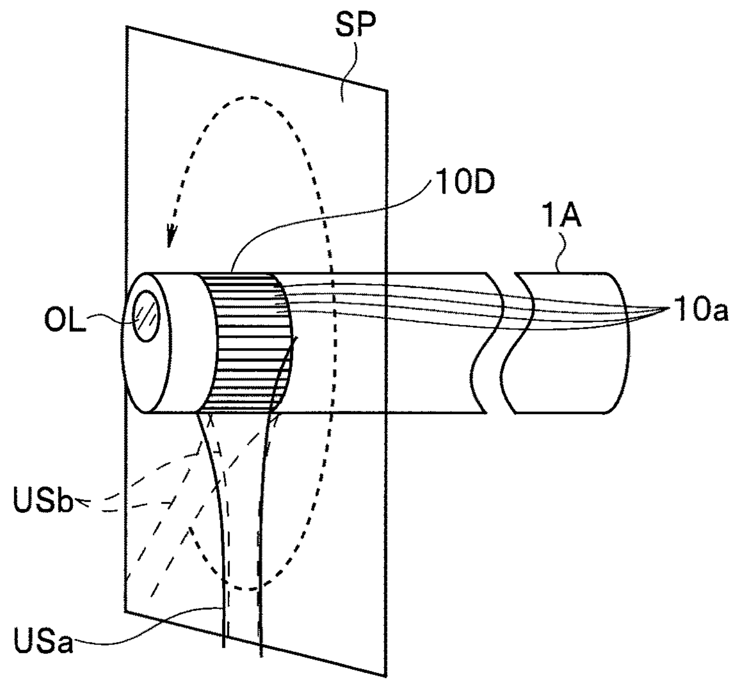
FIG. 23 is a diagram showing a constitutional example of an ultrasound transducer of an ultrasound endoscope according to embodiment 2 of the present invention.

FIG. 23 shows embodiment 2 of the present invention, and is a diagram showing a constitutional example of an ultrasound transducer 10D of the ultrasound endoscope 1A.

In the embodiment 2, components substantially equal to the corresponding components in the above-mentioned embodiment 1 are given the same reference symbols, for example, and the description of such components will be omitted when appropriate. Only points that make the embodiment 2 different from the embodiment 1 will be mainly described.

The ultrasound transducer 10 of the above-mentioned embodiment 1 is of a convex-scanning type. In contrast, the ultrasound transducer 10 of the embodiment 2 is of a radial scanning type.

specifically, the ultrasound transducer 10 shown in FIG. 23 is the ultrasound transducer 10D of a radial scanning one-dimensional array type. A plurality of elements 10*a* are arranged one-dimensionally in a direction about the insertion axis (radial direction), and radial scanning is performed in a scanning plane SP perpendicular to the insertion axis of the ultrasound endoscope 1A as indicated by a dotted arrow in FIG. 23. In FIG. 23, to facilitate intuitive understanding that the scanning plane SP is perpendicular to the insertion axis, the scanning plane SP is depicted by a parallelogram. A B mode scanning range, where B mode scanning is performed by the ultrasound transducer 10D of a radial scanning one-dimensional array type, is not shown in the drawing. However, the B mode scanning range is included in the scanning plane SP.

Also in a case where the ultrasound transducer 10D having such a configuration is used, in the same manner as the above, two kinds of ultrasounds, that is, the acoustic streaming generating ultrasound USa and the measuring ultrasound USb, are transmitted from one ultrasound transducer 10D in a time division manner Other configurations and the manner of operation are also substantially equal to other configurations and the manner of operation of the above-mentioned embodiment 1.

According to the embodiment 2 having such a configuration, it is possible to obtain advantageous effects substantially equal to the advantageous effects of the above-mentioned embodiment 1. Further, the ultrasound endoscope 1A of a radial scanning type is used in place of the ultrasound endoscope 1A of a convex-scanning type and hence, scanning in the radial direction can be achieved.

Figure 24:
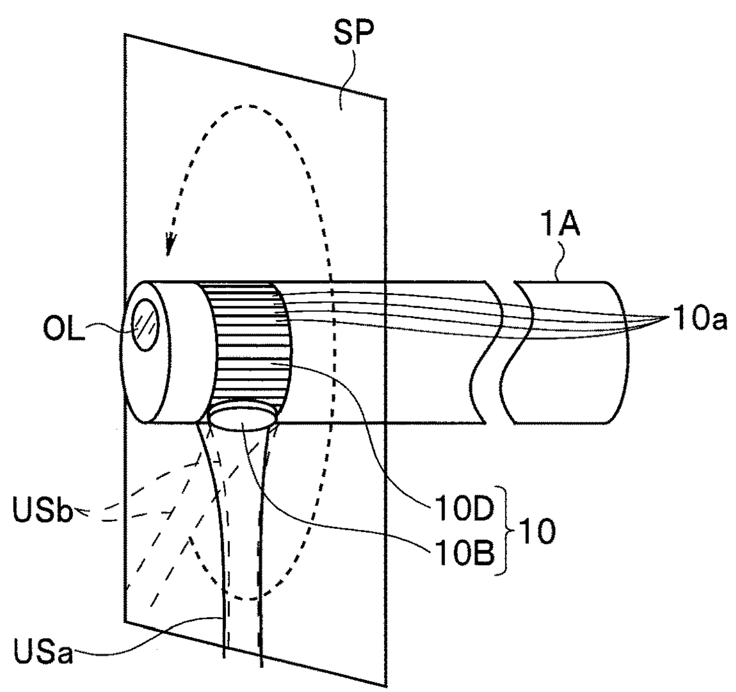
FIG. 24 is a diagram showing a constitutional example of an ultrasound transducer of an ultrasound endoscope according to a first modification of the embodiment 2.

FIG. 24 is a diagram showing a constitutional example of the ultrasound transducer 10 of the ultrasound endoscope 1A according to a first modification of the embodiment 2.

The ultrasound transducer 10 shown in FIG. 24 further includes the single plate transducer 10B in addition to the ultrasound transducer 10D of a radial scanning one-dimensional array type shown in FIG. 23.

In the ultrasound endoscope 1A having such a configuration, the single plate transducer 10B transmits the acoustic streaming generating ultrasound USa, and the ultrasound transducer 10D of a radial scanning one-dimensional array type transmits the measuring ultrasound USb. In the same manner as the case where the single plate transducer 10B is provided to the ultrasound transducer 10 of a convex-scanning one-dimensional array type, two kinds of ultrasounds, that is, the acoustic streaming generating ultrasound USa and the measuring ultrasound USb, can be transmitted simultaneously.

According to the first modification of the embodiment 2, the ultrasound endoscope 1A of a radial scanning type can obtain advantageous effects substantially equal to the advantageous effects of the first modification of the embodiment 1.

The single plate transducer 10B is used in the first modification of the embodiment 2. However, the single plate transducer 10B may be replaced by an annular array ultrasound transducer. The annular array ultrasound transducer is formed of a plurality of divided ultrasound vibration elements having concentric ring shapes. By driving the respective ultrasound vibration elements with respective delays, it is possible to change a focal point as necessary.

Figure 25:
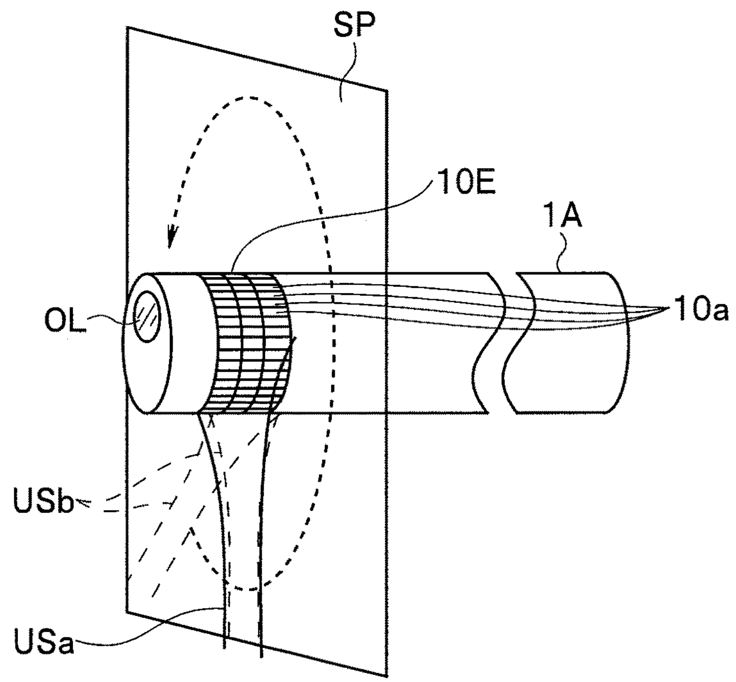
FIG. 25 is a diagram showing a constitutional example of an ultrasound transducer of an ultrasound endoscope according to a second modification of the embodiment 2.

FIG. 25 is a diagram showing a constitutional example of the ultrasound transducer 10 of the ultrasound endoscope 1A according to a second modification of the embodiment 2.

The ultrasound transducer 10 shown in FIG. 25 is an ultrasound transducer 10E of a radial scanning two-dimensional array type, and the plurality of elements 10*a* are arranged two-dimensionally in a direction of the insertion axis and a direction about the insertion axis (radial direction).

According to the second modification of the embodiment 2, the ultrasound endoscope 1A of a radial scanning two-dimensional array type can obtain advantageous effects substantially equal to the advantageous effects of the embodiment 2.

Further, both of the acoustic streaming generating ultrasound USa and the measuring ultrasound USb can also be focused in the elevation direction (the direction of the insertion axis of the ultrasound endoscope 1A). It is also possible to control the beam diameter $\phi(z)$ of ultrasound in a direction parallel to the insertion axis.

Figure 26:
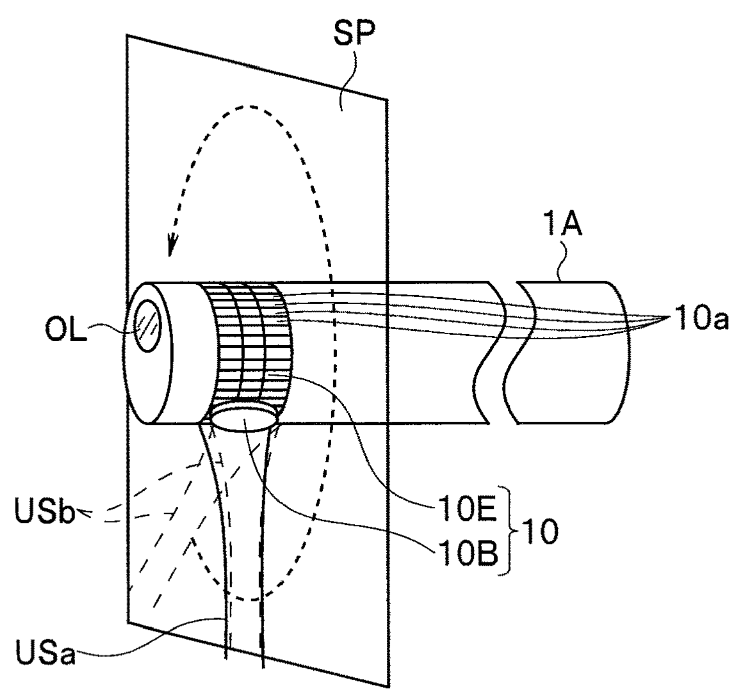
FIG. 26 is a diagram showing a constitutional example of an ultrasound transducer of an ultrasound endoscope according to a third modification of the embodiment 2.

FIG. 26 is a diagram showing a constitutional example of the ultrasound transducer 10 of the ultrasound endoscope 1A according to a third modification of the embodiment 2.

The ultrasound transducer 10 shown in FIG. 26 further includes the single plate transducer 10B in addition to the ultrasound transducer 10E of a radial scanning two-dimensional array type shown in FIG. 25.

Accordingly, when the ultrasound endoscope 1A of a radial scanning two-dimensional array type of the third modification of the embodiment 2 is used, it is possible to obtain advantageous effects substantially equal to the advantageous effects of the first modification of the embodiment 2. In addition to the above, the measuring ultrasound USb can also be focused in the elevation direction.

The single plate transducer 10B is used in the third modification of the embodiment 2. However, the single plate transducer 10B may be replaced by an annular array ultrasound transducer. The annular array ultrasound transducer is formed of a plurality of divided ultrasound vibration elements having concentric ring shapes. By driving the respective ultrasound vibration elements with respective delays, it is possible to change a focal point as necessary.

Embodiment 3

Figure 27:
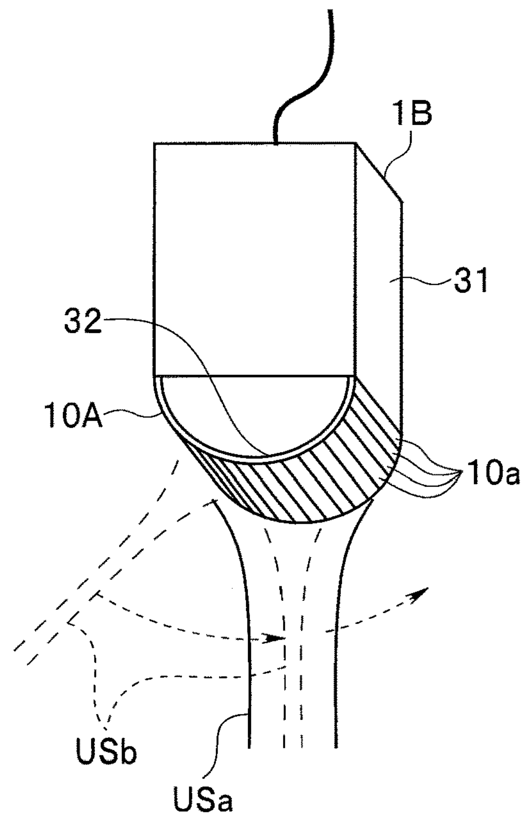
FIG. 27 is a diagram showing a constitutional example of an ultrasound transducer of an external ultrasound probe according to embodiment 3 of the present invention.

FIG. 27 shows embodiment 3 of the present invention, and is a diagram showing a constitutional example of the ultrasound transducer 10 of the external ultrasound probe 1B.

In the embodiment 3, components substantially equal to the corresponding components in the above-mentioned embodiments 1, 2 are given the same reference symbols, for example, and the description of such components will be omitted when appropriate. Only points that make the embodiment 3 different from the embodiments 1 and 2 will be mainly described.

In the above-mentioned embodiments 1, 2, the ultrasound endoscope 1A is connected to the ultrasound diagnostic apparatus 5 as the ultrasound probe 1. In contrast, in an example in the embodiment 3, the external ultrasound probe 1B is connected to the ultrasound diagnostic apparatus 5.

When the external ultrasound probe 1B is connected to the ultrasound diagnostic apparatus 5, processing is performed where the changeover circuit 12 of the ultrasound diagnostic apparatus 5 shown in FIG. 9 is automatically or manually changed over to the second connector 11B side to which the external ultrasound probe 1B is connected.

In the external ultrasound probe 1B, a semicylindrical curved surface 32 is formed on a distal end side of a housing 31 and the plurality of elements 10*a*, which are parallel to a center axis of the semicylindrical curved surface 32, are arranged one-dimensionally along the semicylindrical curved surface 32, thus forming the ultrasound transducer 10A of a convex-scanning one-dimensional array type.

In the same manner as the above-mentioned embodiment 1, two kinds of ultrasounds, that is, the acoustic streaming generating ultrasound USa and the measuring ultrasound USb, are transmitted in a time division manner by using the ultrasound transducer 10A having such a configuration. Other configurations and the manner of operation are also substantially equal to other configurations and the manner of operation of the above-mentioned embodiment 1.

According to the embodiment 3 having such a configuration, even when the external ultrasound probe 1B is used, it is possible to obtain advantageous effects substantially equal to the advantageous effects of the above-mentioned embodiment 1.

Figure 28:
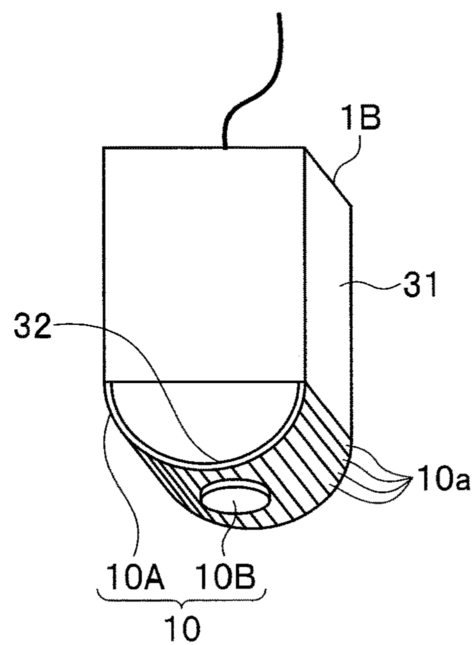
FIG. 28 is a diagram showing a constitutional example of an ultrasound transducer of an external ultrasound probe according to a first modification of the embodiment 3.

FIG. 28 is a diagram showing a constitutional example of the ultrasound transducer 10 of the external ultrasound probe 1B according to a first modification of the embodiment 3.

The ultrasound transducer 10 shown in FIG. 28 further includes the single plate transducer 10B in addition to the ultrasound transducer 10A of a convex-scanning one-dimensional array type shown in FIG. 27. The single plate transducer 10B is disposed at a center portion of the ultrasound transducer 10A of a convex-scanning one-dimensional array type.

In the external ultrasound probe 1B having such a configuration, the single plate transducer 10B transmits the acoustic streaming generating ultrasound USa, and the ultrasound transducer 10A of a convex-scanning one-dimensional array type transmits the measuring ultrasound USb. In the same manner as the above, two kinds of ultrasounds, that is, the acoustic streaming generating ultrasound USa and the measuring ultrasound USb, can be transmitted simultaneously.

According to the first modification of the embodiment 3, the ultrasound endoscope 1A of a convex-scanning one-dimensional array type can obtain advantageous effects substantially equal to the advantageous effects of the first modification of the embodiment 1.

The single plate transducer 10B is used in the first modification of the embodiment 3. However, the single plate transducer 10B may be replaced by an annular array ultrasound transducer. The annular array ultrasound transducer is formed of a plurality of divided ultrasound vibration elements having concentric ring shapes. By driving the respective ultrasound vibration elements with respective delays, it is possible to change a focal point as necessary.

Figure 29:
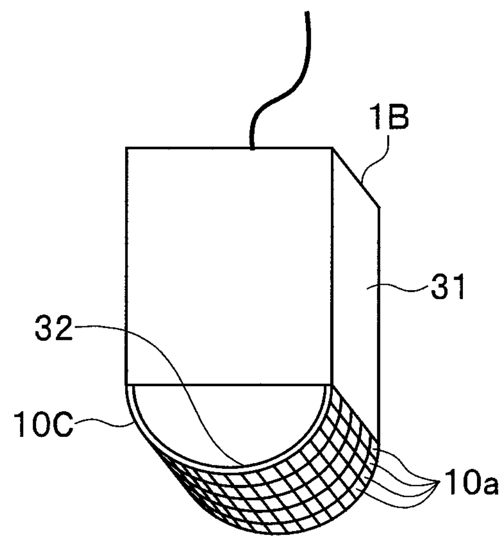
FIG. 29 is a diagram showing a constitutional example of an ultrasound transducer of an external ultrasound probe according to a second modification of the embodiment 3.

FIG. 29 is a diagram showing a constitutional example of the ultrasound transducer 10 of the external ultrasound probe 1B according to a second modification of the embodiment 3.

The ultrasound transducer 10 shown in FIG. 29 has a configuration where the ultrasound transducer 10A of a convex-scanning one-dimensional array type of the ultrasound transducer 10 shown in FIG. 27 is replaced by the ultrasound transducer 10C of a convex-scanning two-dimensional array type shown in FIG. 29.

When the external ultrasound probe 1B of a convex-scanning two-dimensional array type of the second modification of the embodiment 3 is used, it is possible to obtain advantageous effects substantially equal to the advantageous effects of the embodiment 3.

Further, both of the acoustic streaming generating ultrasound USa and the measuring ultrasound USb can also be focused in the elevation direction. It is also possible to control the beam diameter $\phi(z)$ of ultrasound in a direction parallel to the center axis of the semicylindrical curved surface 32.

Figure 30:
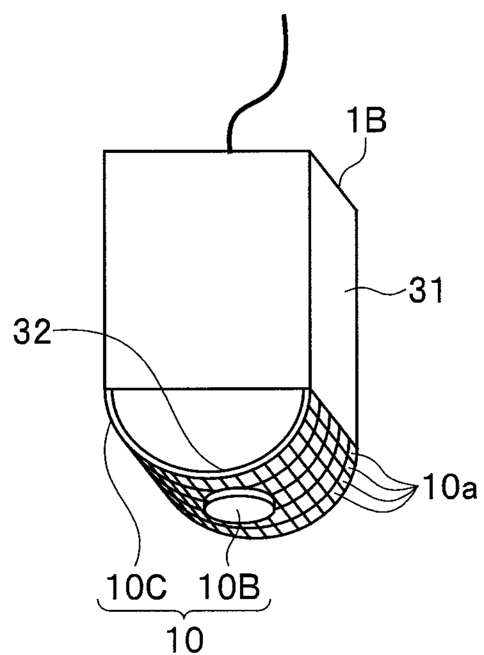
FIG. 30 is a diagram showing a constitutional example of an ultrasound transducer of an external ultrasound probe according to a third modification of the embodiment 3.

FIG. 30 is a diagram showing a constitutional example of the ultrasound transducer 10 of the external ultrasound probe 1B according to a third modification of the embodiment 3.

The ultrasound transducer 10 shown in FIG. 30 has a configuration where the ultrasound transducer 10A of a convex-scanning one-dimensional array type of the ultrasound transducer 10 shown in FIG. 28 is replaced by the ultrasound transducer 10C of a convex-scanning two-dimensional array type shown in FIG. 29. In the same manner as the configuration shown in FIG. 28, the single plate transducer 10B is disposed at a center portion of the ultrasound transducer 10C of a convex-scanning two-dimensional array type.

Accordingly, when the external ultrasound probe 1B of a convex-scanning two-dimensional array type of the third modification of the embodiment 3 is used, it is possible to obtain advantageous effects substantially equal to the advantageous effects of the first modification of the embodiment 3. In addition to the above, the measuring ultrasound USb can also be focused in the elevation direction.

The single plate transducer 10B is used in the third modification of the embodiment 3. However, the single plate transducer 10B may be replaced by an annular array ultrasound transducer. The annular array ultrasound transducer is formed of a plurality of divided ultrasound vibration elements having concentric ring shapes. By driving the respective ultrasound vibration elements with respective delays, it is possible to change a focal point as necessary.

Embodiment 4

Figure 31:
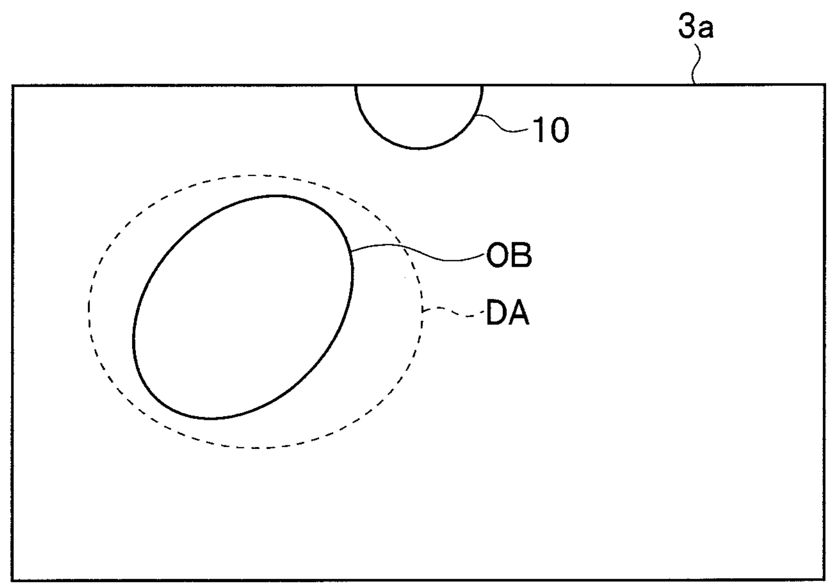
FIG. 31 is a diagram for describing processing of designating the target region according to embodiment 4 of the present invention.

FIG. 31 to FIG. 35 show embodiment 4 of the present invention. FIG. 31 is a diagram for describing processing of designating the target region OB.

In the embodiment 4, components substantially equal to the corresponding components in the above-mentioned embodiments 1 to 3 are given the same reference symbols, for example, and the description of such components will be omitted when appropriate. Only points that make the embodiment 4 different from the embodiments 1 to 3 will be mainly described.

The above-mentioned embodiments 1 to 3 rely on the premise that the target region OB is approximated as a sphere (a circle on the B mode image). However, the present embodiment relies on the premise that the target region OB is approximated as an ellipsoid (or a spheroid) (an ellipse on the B mode image).

In the present embodiment, the operator, for example, surrounds the target region OB by using the touch pad 2$b$ as indicated by a dotted line DA in FIG. 31 on the B mode image to designate the target region OB.

In the present embodiment, an example has been described where the target region OB is manually designated. However, the target region OB may be automatically designated. The target region OB may be designated by performing pattern matching by image analysis, for example.

Alternatively, a configuration may be adopted where the operator roughly designates a region including the target region OB by surrounding the target region OB with the dotted line DA as shown in FIG. 31 and, in such a state, pattern matching is performed by image analysis within the designated region to designate the target region OB more accurately. By combining such a manual operation and an automatic operation, it is possible to designate the target region OB more accurately in a short time period.

Figure 32:
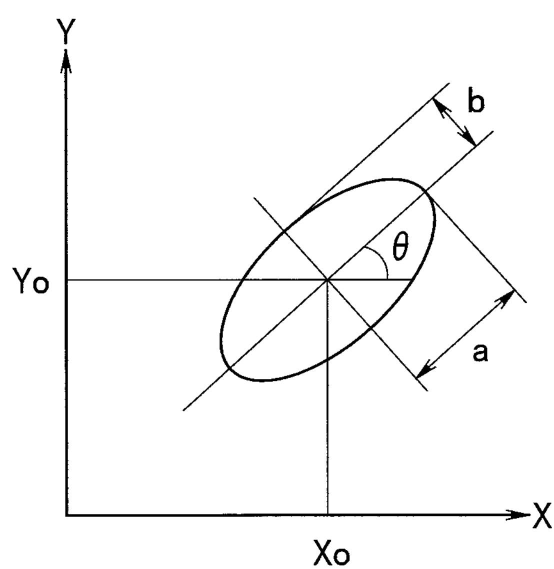
FIG. 32 is a graph for describing a general equation of an ellipse in the embodiment 4.

Next, the target extraction circuit 22 causes a shape of the target region OB designated on the B mode image to be approximated as an ellipse. A general equation of an ellipse is shown in the following equation 14 by using center coordinates $(X_o, Y_o)$ of the ellipse, an inclination $\theta$ of a major axis, the major axis a, and a minor axis b. FIG. 32 is a graph for describing the general equation of an ellipse.

$$\left(\frac{(X-X_o)\cos\theta+(Y-Y_o)\sin\theta}{a}\right)^2+\left(\frac{-(X-X_o)\sin\theta+(Y-Y_o)\cos\theta}{b}\right)^2=1 \quad \text{[Equation 14]}$$

The equation 14 is expanded and then rearranged with respect to X, Y, thus obtaining the following equation 15.

$$X^2+AXY+BY^2+CX+DY+E=0 \quad \text{[Equation 15]}$$

Five unknowns, that is, A to E, are used in the equation 15. To decide these unknowns A to E by a least squares method, M (M being an integer of five or more) number of coordinates $(X_i, Y_i)$ of points (boundary points) on the boundary of the target region OB designated on the B mode image are obtained. In this case, i is a natural number of 1 to M indicating the number of boundary point. The coordinates of the boundary point are substituted into a left side of the equation 15 and the result is squared. Such calculation is performed for each of M number of boundary points, and an average Ave is calculated as shown in the following equation 16.

$$\text{Ave}=\frac{1}{M}\sum_{i=1}^{M}\left(X_i^2+AX_iY_i+BY_i^2+CX_i+DY_i+E\right)^2 \quad \text{[Equation 16]}$$

An ellipse approximating the target region OB is calculated by deciding values of A to E such that the average Ave shown in the equation 16 takes a minimum value. Further, $X_0$, $Y_o$, $\theta$, a, b are calculated from the decided values of A to E to obtain center coordinates $(X_o, Y_o)$ of the ellipse, the inclination $\theta$ of the major axis, the major axis a (and coordinates of both ends of the major axis to display a major axis marker 3$ma$, which will be described later), and the minor axis b.

The description has been made for an example where elliptic approximation is made by the least squares method in the present embodiment. However, other approximation method may be used.

The display control circuit 25 causes the acoustic streaming generating ultrasound marker MK and the major axis marker 3*ma* to be superposed on the B mode image, the acoustic streaming generating ultrasound marker MK indicating the transmission direction of the acoustic streaming generating ultrasound USa, the major axis marker 3*ma* indicating a position of the major axis of the approximating ellipse. The display circuit 16 causes the B mode image, on which the acoustic streaming generating ultrasound marker MK and the major axis marker 3*ma* are superposed, to be displayed on the screen 3*a* of the monitor 3 as shown in FIG. 33.

The operator checks whether the acoustic streaming generating ultrasound marker MK is aligned with the major axis marker 3*ma* by observing the screen 3*a* of the monitor 3. When the acoustic streaming generating ultrasound marker MK is not aligned with the major axis marker 3*ma*, the operator changes the position and the direction of the ultrasound probe 1 to make adjustment in order for the major axis marker 3*ma* and the acoustic streaming generating ultrasound marker MK to be as coaxial as possible. At this point of operation, it is not always necessary to cause the major axis marker 3*ma* to be completely aligned with the acoustic streaming generating ultrasound marker MK. However, adjustment is made such that the major axis marker 3*ma* is aligned with any of the scanning directions of the ultrasound transducer 10 (in other words, the major axis marker 3*ma* is on a radius at an angle out of numerous radii drawn from the center of curvature of the ultrasound transducer 10 on the B mode image).

Figure 33:
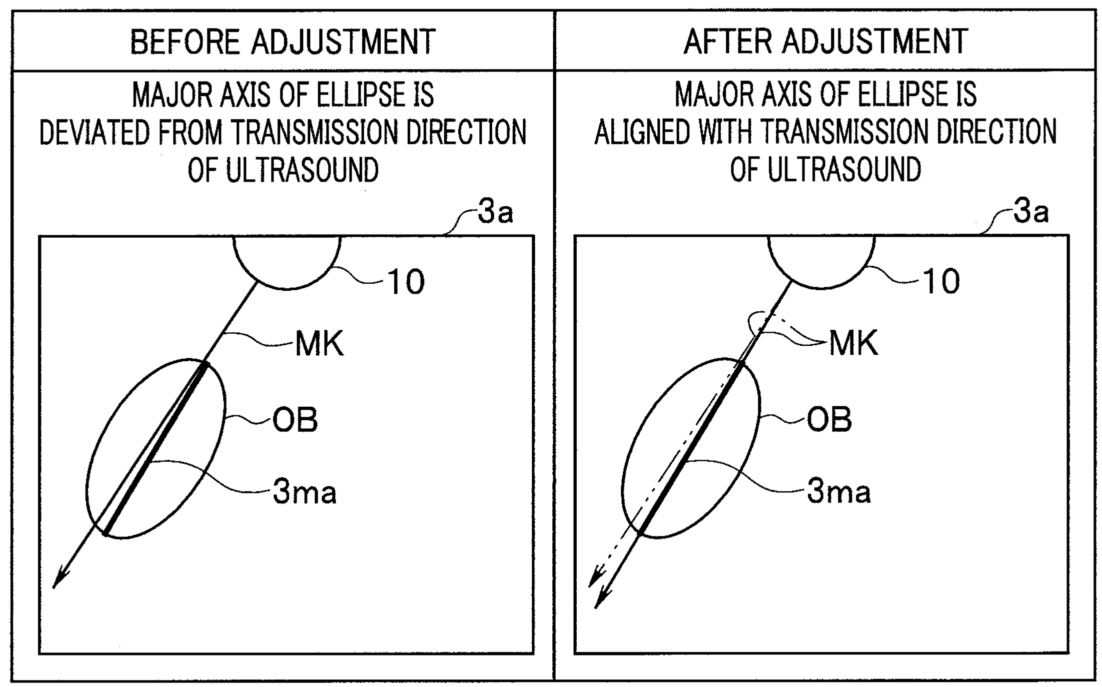
FIG. 33 is a table showing states before and after adjustment of a transmission direction of acoustic streaming generating ultrasound in the embodiment 4.

A left column in FIG. 33 shows a state after the position and the direction of the ultrasound probe 1 are schematically adjusted by the operator. FIG. 33 is a table showing states before and after adjustment of the transmission direction of the acoustic streaming generating ultrasound USa.

As shown in the left column in FIG. 33, in a state before adjustment is completely made, there is still a deviation between the major axis of the ellipse and the transmission direction of the acoustic streaming generating ultrasound USa. For this reason, the major axis marker 3*ma* and the acoustic streaming generating ultrasound marker MK are not coaxial with each other.

Therefore, the control circuit 20 sets drive conditions under which the acoustic streaming generating ultrasound marker MK indicating the transmission direction of the acoustic streaming generating ultrasound USa is superposed on the major axis marker 3*ma*.

With such setting, the acoustic streaming generating ultrasound marker MK is superposed on the major axis marker 3*ma* as shown by a solid line arrow in a right column in FIG. 33 after the adjustment is made.

Figure 34:
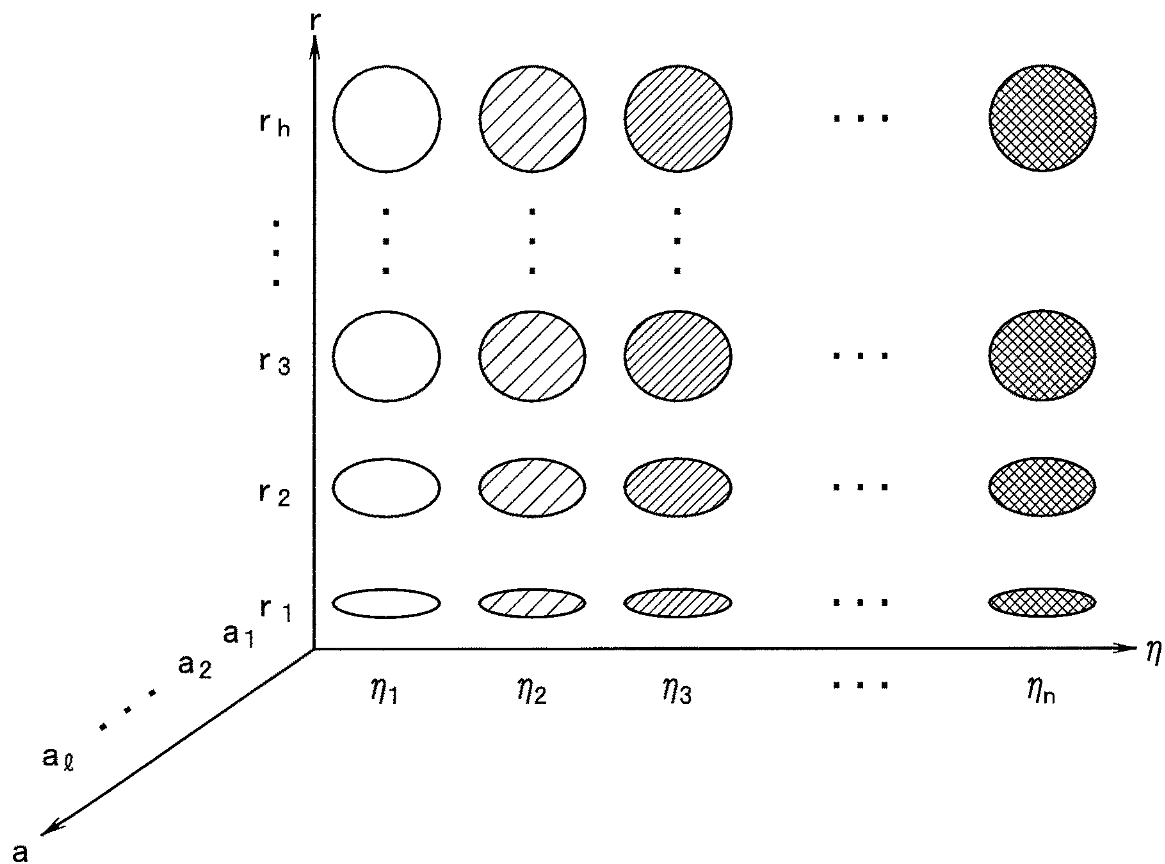
FIG. 34 is a diagram for describing an example where plural kinds of simulation ellipsoids are prepared as models of the target regions to measure flow velocities of acoustic streamings corresponding to sizes, shapes, and physical property values of the target regions before factory shipment in the embodiment 4.

FIG. 34 is a diagram for describing an example where plural kinds of simulation ellipsoids are prepared as model bodies of the target regions OB to measure flow velocities v of the acoustic streamings AS corresponding to sizes, shapes, and physical property values of the target region OB before factory shipment.

In the factory, simulation ellipsoids having different sizes, shapes, and physical property values are prepared as the model bodies of the target regions OB. In the present embodiment, to suppress an increase in parameter, a spheroid (a spheroid obtained by rotating an ellipse having a major axis a and a minor axis b about the major axis) is particularly used as the ellipsoid.

Specifically, as model bodies of a cystic disease, plural kinds of simulation ellipsoids are prepared, the simulation ellipsoids containing liquids with different shear viscosity coefficients and having different major axes a (first parameter) and different ratios r (second parameter) between the major axis a and the minor axis b shown in equation 17.

$$r = \frac{b}{a} \quad \text{[Equation 17]}$$

In the example shown in FIG. 34, n×1×h kinds of simulation ellipsoids are prepared in total, n×1×h being obtained by combining n kinds of shear viscosity coefficients $\eta_1$ to $\eta_n$, 1 kinds of major axes $a_1$ to $a_1$, and h kinds of ratios $r_1$ to $r_h$.

In the factory, the irradiation conditions 1 to 3 (or the irradiation condition 3' in place of the irradiation condition 3) described in the above-mentioned embodiment 1 are set, and the following irradiation condition 4 is also set.

Irradiation condition 4: the transmission direction of ultrasound is caused to be aligned with the major axis of the simulation ellipsoid In such a state, each of the n×1×h kinds of simulation ellipsoids is irradiated with the acoustic streaming generating ultrasounds USa with k kinds of beam diameters $\phi(z_s)$, for example, to generate the acoustic streamings AS. Then, flow velocities v of the acoustic streamings AS are measured by Doppler mode scanning, for example. With such operations, k×n×1×h pieces of flow velocity data are obtained.

Figure 35:
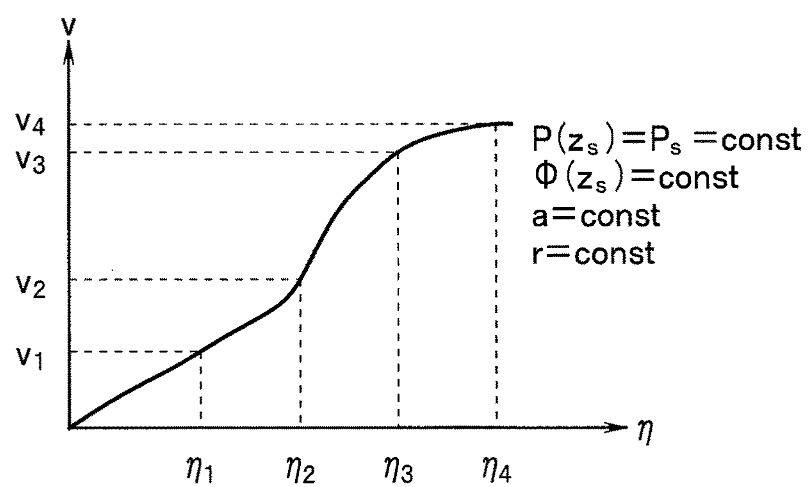
FIG. 35 is a graph showing one example of a relationship between the flow velocity of the acoustic streaming and the shear viscosity coefficient at a time of setting constant values for a sound pressure and a beam diameter on the boundary surface of the simulation ellipsoid having a specific size and a specific shape in the embodiment 4.

When an η-v curve with specific conditions of "$P(z_s)=P_s$ (constant), $\phi(z_s)$=constant, a=constant, r=constant" is extracted from the flow velocity data obtained in this manner, an η-v curve shown in FIG. 35, for example, is obtained. FIG. 35 is a graph showing one example of the relationship between the flow velocity v of the acoustic streaming AS and the shear viscosity coefficient at the time of setting constant values for the sound pressure and the beam diameter on the boundary surface of the simulation ellipsoid having a specific size and shape.

The curve (η-v curve) shown in FIG. 35 shows the relationship between the flow velocity v and the shear viscosity coefficient η, and k×1×h number of curves (η-v curves) are formed for combinations of k kinds of beam diameters $\phi(z_s)$, 1 kinds of major axes a, and h kinds of ratios r. The relationship data formed as described above are stored in the storage 17 of the ultrasound diagnostic apparatus 5 before factory shipment.

In the same manner as the above-mentioned embodiment 1, the shear viscosity coefficient η that corresponds to the flow velocity v is estimated by referencing the η-v curve shown in FIG. 35, the curve corresponding to the beam diameter $\phi(z_s)$, the major axis a, and the ratio r at the time of performing the inspection with the ultrasound diagnostic system.

The major axis a is used as the first parameter indicating the size of the target region OB (the size of the ellipse in the present embodiment) in the above. However, the minor axis b may be used in place of the major axis a. Alternatively, a combination of the major axis a and the minor axis b, for example, $\sqrt{(a\ b)}$ (a radius obtained by converting an ellipse approximating the target region OB on the B mode image into a circle of equal area, for example) may be used.

The ratio r between the major axis a and the minor axis b is used as the second parameter indicating the shape of the target region OB (a flattened shape of the ellipse in the present embodiment) in the above. However, an eccentricity e shown in an equation 18 or an oblateness F shown in an equation 19 may be used in place of the ratio r between the major axis a and the minor axis b (all of the equations 17 to 19 are function of (b/a)).

$$e=\sqrt{1-\left(\frac{b}{a}\right)^2}=\sqrt{1-r^2} \quad \text{[Equation 18]}$$

$$F=1-\frac{b}{a}=1-r \quad \text{[Equation 19]}$$

According to the embodiment 4 having such a configuration, it is possible to obtain advantageous effects substantially equal to the advantageous effects of the above-mentioned embodiments 1 to 3. Further, relationship data are stored in the storage 17 further according to the shape of the target region OB. Accordingly, by selecting the relationship data corresponding to the shape of the cystic disease and by adjusting the position and the angle (orientation) of the ultrasound transducer with respect to the cystic disease to conform with the angle of the model body at the time of relationship data being measured, it is possible to estimate physical property values more accurately.

At this point of operation, particularly, the shape of the target region OB is caused to be approximated as an ellipse to calculate the position of the major axis, and the major axis marker 3*ma*, indicating the position of the major axis, and the acoustic streaming generating ultrasound marker MK, indicating the transmission direction of the acoustic streaming generating ultrasound USa, are superposed on the ultrasound image. With such operations, it is possible to easily perform positioning for performing irradiation with the acoustic streaming generating ultrasound USa along the major axis of the ellipse.

By the operator performing rough adjustment of the position and the angle (orientation) of the ultrasound probe 1 by setting drive conditions under which a line indicating the transmission direction of the acoustic streaming generating ultrasound USa is superposed on the position of the major axis of the ellipse, the transmission direction of the acoustic streaming generating ultrasound USa can be automatically adjusted in an appropriate direction.

Irradiation is performed with the acoustic streaming generating ultrasound USa along the major axis of the ellipse. Accordingly, it is possible to increase a length of a path where the acoustic streaming AS accelerates and hence, the acoustic streaming AS having a high flow velocity v can be obtained.

Further, relationship data are stored in the storage 17 according to the first parameter, indicating the size of the ellipse, the second parameter, indicating the flattened shape of the ellipse, and the parameter relating to the distance. Accordingly, it is possible to accurately estimate physical property values for various target regions OB having different sizes and different flattened shapes.

In this manner, physical property values of the target region OB can be estimated more accurately based on ultrasound echoes of acoustic streaming without being affected by the position, the size, or the orientation of the target region OB.

In measuring the flow velocities v for relationship data, the sound pressure $P(z_s)$ on the boundary surface of the target region OB ($z=z_s$) is set to the specific sound pressure $P_s$ and the beam diameter $\phi(z_s)$ is set to various values in the above-mentioned embodiment 1, and the beam diameter $\phi(z_s)$ is set to the specific diameter $\phi_s$ and the sound pressure $P(z_s)$ is set to various values in the modification of the above-mentioned embodiment 1 (and other embodiments and modifications). However, the sound pressure $P(z_s)$ and the beam diameter $\phi(z_s)$ are not limited to the above. If a situation is allowed where the number of parameters of relationship data increases, thus increasing the amount of data, both of the sound pressure $P(z_s)$ and the beam diameter $\phi(z_s)$ may be set to various values. In contrast, in a case where both the sound pressure $P(z_s)$ and the beam diameter $\phi(z_s)$ on the boundary surface of the target region OB can be always set to constant values at the time of performing the ultrasound inspection, relationship data may be formed by measuring flow velocities v only for a case where the beam diameter $\phi(0)=\phi(z_s)=\phi_s$ is the specific diameter $\phi_s$, and the transmission sound pressure $P(0)=P(z_s)=P_s$ is the specific sound pressure $P_s$.

Embodiment 5

Figures 36, 37:
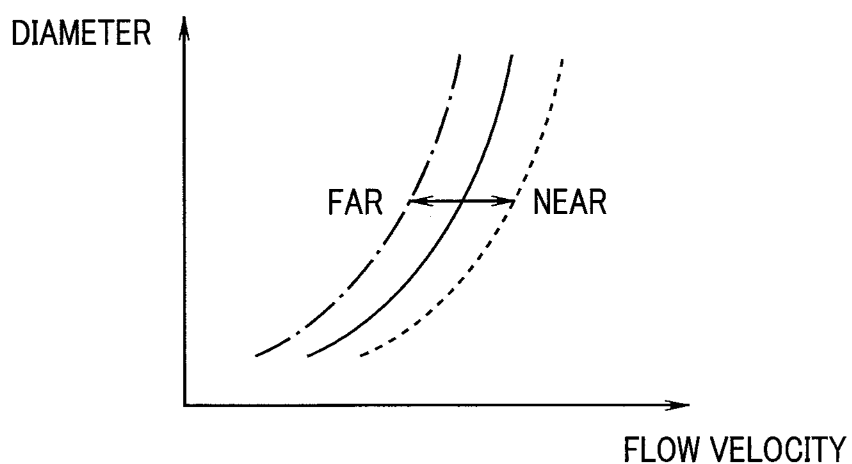
FIG. 36 is a diagram showing an example of relationship data with a distance per se being used as a parameter relating to the distance in embodiment 5 of the present invention.
FIG. 37 is a graph showing curves that indicate relationship between the diameter of the simulated ball and the flow velocity, and showing a change for the curve according to the distance to the simulated ball in the embodiment 5.

FIG. 36 to FIG. 39 show embodiment 5 of the present invention. FIG. 36 is a diagram showing an example of relationship data with a distance per se being used as a parameter relating to the distance.

In the above-mentioned embodiment 1, functions that depend on the depth z (distance), such as the beam diameter $\phi(z)$ and the sound pressure $P(z)$, are anticipated as the parameters relating to the distance. In contrast, in the present embodiment, a distance per se is used as the parameter relating to the distance.

In other words, in the factory, model bodies are prepared. For example, plural kinds of simulated balls having different shear viscosity coefficients and different diameters d as shown in FIG. 6 are prepared or plural kinds of simulation ellipsoids having different shear viscosity coefficients different major axes a, and different ratios r as shown in FIG. 34 are prepared. In the present embodiment, the simulated balls shown in FIG. 6, for example, are prepared.

The simulated balls are immersed into a medium (a solution or the like) with a typical attenuation rate $\zeta$ in the subject. In such a state, the ultrasound transducer 10 is disposed at a position away from each simulated ball by various distances (for example, 5 mm, 10 mm, . . . , 50 mm or the like). Further, the acoustic streaming generating ultrasound USa is transmitted to the simulated ball having a combination of each diameter d and each viscosity coefficient for each distance, the acoustic streaming generating ultrasound USa having a constant intensity and a constant opening diameter and having a focal point at a specific position (the center, the center of gravity, or around the center or the center of gravity) of the simulated ball. Then, the flow velocity v of the acoustic streaming AS generated in each simulated ball is measured.

With such operations, relationship data shown in FIG. 36 are formed that provide correspondence of the shear viscosity coefficient with respect to the flow velocity v by using the distance (for example, the boundary surface depth $z_s$) from the ultrasound transducer 10 to the simulated ball and the diameter d of the simulated ball as parameters. The formed relationship data are stored in the storage 17 as described above. FIG. 36 shows an example where relationship data are formed in the form of a reference table (table). However, as described above, relationship data may be formed in the form of a function (equation).

Figure 38:
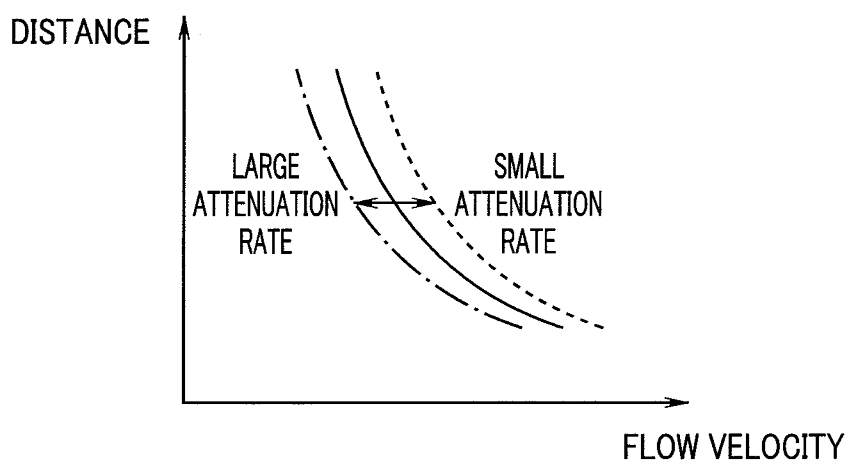
FIG. 38 is a graph showing curves that indicate the relationship between the distance to the simulated ball and the flow velocity, and showing a change for the curve according to an attenuation rate of a medium into which the simulated ball is immersed in the embodiment 5.

FIG. 37 is a graph showing curves that indicate the relationship between the diameter d of the simulated ball and the flow velocity v, and showing a change for the curve according to the distance to the simulated ball. FIG. 38 is a graph showing curves that indicate the relationship between the distance to the simulated ball and the flow velocity v, and showing a change for the curve according to the attenuation rate ζ of a medium into which the simulated ball is immersed.

The solid-line curve in FIG. 37 shows a change in the flow velocity v of the acoustic streaming AS generated in the simulated ball according to the diameter d of the simulated ball when the distance to the simulated ball is set to a constant value and the shear viscosity coefficient of liquid in the simulated ball is also set to a constant value. As described with reference to FIG. 3, a simulated ball with a larger diameter d is less affected by friction between liquid in the simulated ball and an inner surface of the simulated ball. Accordingly, the flow velocity v increases as the diameter d increases.

As the distance increases, energy of the acoustic streaming generating ultrasound USa with which the boundary surface of the simulated ball is irradiated decreases. Accordingly, even with the same diameter d, the flow velocity v of the acoustic streaming AS reduces more when the distance is large as shown by a dashed-line curve than when the distance is small as shown by a dotted-line curve. FIG. 38 specifically shows dependence of the flow velocity v on the distance.

The solid-line curve in FIG. 38 shows a state of change in flow velocity v of the acoustic streaming AS generated in the simulated ball according to the distance from the ultrasound transducer 10 to the simulated ball when the diameter d of the simulated ball is set to a constant value and the shear viscosity coefficient of liquid in the simulated ball is also set to a constant value. As shown in FIG. 38, the flow velocity v monotonously decreases according to an increase in distance.

As described in the above-mentioned embodiment 1, at the time of performing the ultrasound inspection, the distance from the ultrasound transducer 10 to the cystic disease and the diameter d of the cystic disease approximating a sphere are obtained and, then, a column for corresponding distance and diameter d is selected from relationship data shown in FIG. 36. Thereafter, a constant acoustic streaming generating ultrasound is transmitted to the cystic disease to generate acoustic streaming, the flow velocity v is measured, and relationship data are referenced based on the flow velocity v. With such operations, the shear viscosity coefficient of the cystic disease is obtained. Needless to say, when corresponding distance, diameter d, or flow velocity v is not given at this point of operation, interpolation is performed when appropriate.

Figure 39:
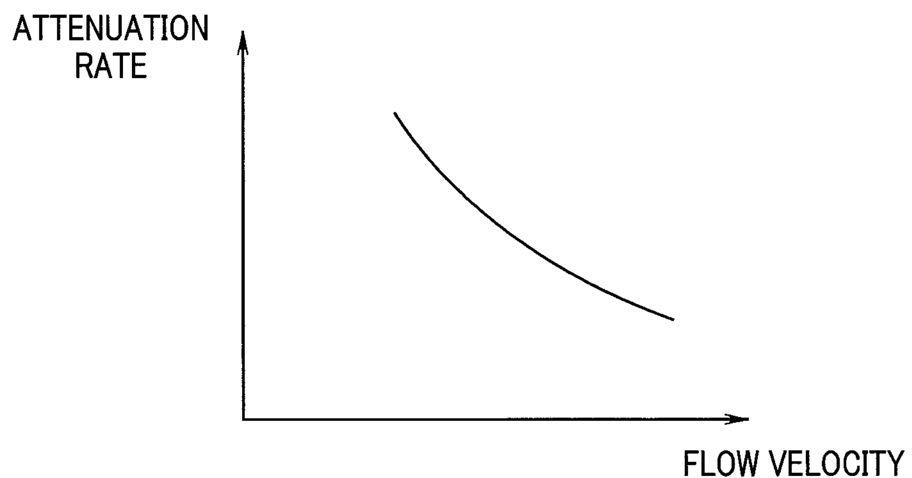
FIG. 39 shows a curve showing the relationship between the flow velocity and the attenuation rate of the medium which is present between the ultrasound transducer and the simulated ball in the embodiment 5.

As described also in the embodiment 1, the value of the attenuation rate ζ varies depending on a part of the subject. The dashed-line curve in FIG. 38 shows a relationship between the distance and the flow velocity v when the attenuation rate ζ is larger than for the solid-line curve. The dotted-line curve shows a relationship between the distance and the flow velocity v when the attenuation rate ζ is smaller than for the solid-line curve. As shown in the drawing, even with the equal distances, energy of the acoustic streaming generating ultrasound USa with which the boundary surface of the simulated ball is irradiated decreases as the attenuation rate ζ increases. Accordingly, the flow velocity v of the acoustic streaming AS reduces more when the attenuation rate ζ is large than when the attenuation rate ζ is small. FIG. 39 specifically shows dependence of the flow velocity v on the attenuation rate ζ.

FIG. 39 shows a curve showing the relationship between the flow velocity v and the attenuation rate ζ of a medium which is present between the ultrasound transducer 10 and the simulated ball.

The solid-line curve in FIG. 39 shows a state of change in flow velocity v of the acoustic streaming AS generated in the simulated ball according to the attenuation rate ζ of the medium which is present between the ultrasound transducer 10 and the simulated ball when the diameter d of the simulated ball is set to a constant value, the shear viscosity coefficient of liquid in the simulated ball is set to a constant value, and the distance from the ultrasound transducer 10 to the simulated ball is set to a constant value. As shown in FIG. 39, the flow velocity v monotonously decreases according to an increase in attenuation rate ζ.

Accordingly, if a situation is allowed where the number of parameters of relationship data increases, thus increasing the amount of data, it is preferable that mediums with various attenuation rates ζ be prepared in advance as mediums (solutions or the like) into which the simulated balls are to be immersed in the factory and relationship data shown in FIG. 36 be formed for the medium with each attenuation rate ζ.

The relationship data shown in FIG. 36 are data formed by transmitting the acoustic streaming generating ultrasound USa with a constant intensity and a constant opening diameter. However, there may also be a case where it is desired to change an intensity or an opening diameter according to the subject. In view of the above, if a situation is allowed where the number of parameters of relationship data increases, thus increasing the amount of data, it is preferable that the intensity be set to a first constant value, a second constant value, or the like, the opening diameter be set to a first constant value, a second constant value, or the like, and relationship data shown in FIG. 36 be formed for each combination of the intensity and the opening diameter.

Needless to say, the configuration of the embodiment 5 is also applicable to the ultrasound probe 1 with any combination of an ultrasound endoscope or an external ultrasound probe, a radial scanning type or a convex-scanning type, and a one-dimensional array type or a two-dimensional array type which are described in the above-mentioned respective embodiments.

According to the embodiment 5 having such a configuration, relationship data indicating correspondence between the flow velocity v and the shear viscosity coefficient are formed according to the distance from the ultrasound transducer 10 to the model body and the size of the model body. Accordingly, by only obtaining the distance to the target region OB and the size of the target region OB, it is possible to accurately estimate the shear viscosity coefficient of the target region OB without changing the irradiation condition of the acoustic streaming generating ultrasound USa (in other words, by only transmitting a constant acoustic streaming generating ultrasound USa at the time of transmitting the acoustic streaming generating ultrasound USa from the ultrasound transducer 10).

In the above-mentioned description, the description has been made mainly for the case where the present invention is the ultrasound diagnostic apparatus or the ultrasound diagnostic system. However, the present invention is not limited to the above, and may be a method for actuating the ultrasound diagnostic apparatus (or the ultrasound diagnostic system) as described above, may be a computer program that causes a computer to perform processing substantially equal to processing performed by the ultrasound diagnostic apparatus (or the ultrasound diagnostic system), or a non-transitory recording medium that can be read by a computer in which the computer program is recorded, for example.

The present invention is not limited to the above-mentioned embodiments as they are, and can be embodied by applying a modification to constitutional elements in the implementation stage without departing from the gist of the present invention. Further, various modes of the invention can be formed by suitably combining a plurality of constitutional elements disclosed in the embodiments. For example, some constitutional elements out of all constitutional elements described in the embodiments may be deleted. The constitutional elements used in a different embodiment may be suitably combined. As described above, needless to say, various modifications and applications are conceivable without departing from the gist of the invention.

What is claimed is:

1. An ultrasound diagnostic apparatus comprising:

a drive circuit configured to transmit a drive signal to an ultrasound transducer;

a receiving circuit configured to receive an echo signal from the ultrasound transducer;

a storage configured to store relationship data according to a size of the target region and a parameter that depends on a distance, the relationship data providing a correspondence between a flow velocity of an acoustic streaming being generated in liquid in the target region and a physical property value of the liquid; and a processor, configured to:

obtain, based on the echo signal or a user input, target information containing at least one of a distance from the ultrasound transducer to a target region containing the liquid or the size of the target region, and set, based on the target information, a drive condition under which a first acoustic streaming generating ultrasound transmitted by the ultrasound transducer generates the acoustic streaming in the liquid in the target region;

control the drive circuit such that the drive signal based on the drive condition is transmitted to the ultrasound transducer;

calculate the flow velocity of the liquid by analyzing the echo signal at a time of the acoustic streaming being generated in the liquid; and obtain the relationship data corresponding to the target information including the size of the target region from the storage, and estimate the physical property value by referencing the relationship data based on the flow velocity, the relationship data are data measured by irradiating boundary surfaces of a plurality of model bodies with second acoustic streaming generating ultrasound having a specific irradiation condition, the model bodies being obtained by modelling the target region, and having different sizes and different physical property values, and the processor is configured to set the drive condition under which the first acoustic streaming generating ultrasound on the boundary surface of the target region coincide with the second acoustic streaming generating ultrasound.

2. The ultrasound diagnostic apparatus according to claim 1, wherein the parameter that depends on the distance includes at least one of “a sound pressure or an intensity” or “a beam diameter or a beam area” of the second acoustic streaming generating ultrasound on the boundary surface of the model body.

3. The ultrasound diagnostic apparatus according to claim 2, wherein the parameter that depends on the distance includes the beam diameter of the second acoustic streaming generating ultrasound on the boundary surface of the model body, the relationship data are data measured by irradiating the model body with the second acoustic streaming generating ultrasound while changing the beam diameter, the second acoustic streaming generating ultrasound having a focal point at a specific position in the model body, the sound pressure of the second acoustic streaming generating ultrasound on the boundary surface of the model body being a specific sound pressure, and the drive condition is a condition under which a sound pressure of the first acoustic streaming generating ultrasound on the boundary surface of the target region is equal to the specific sound pressure.

4. The ultrasound diagnostic apparatus according to claim 3, wherein the processor is configured to:

estimate an attenuation rate of the first acoustic streaming generating ultrasound in a range from a surface of the ultrasound transducer to the boundary surface of the target region based on the echo signal;

calculate a transmission sound pressure from the ultrasound transducer, the transmission sound pressure causing the sound pressure of the first acoustic streaming generating ultrasound on the boundary surface of the target region at a time of attenuation according to the attenuation rate to be equal to the specific sound pressure; and set the drive condition under which the ultrasound transducer transmits the first acoustic streaming generating ultrasound at the transmission sound pressure.

5. The ultrasound diagnostic apparatus according to claim 2, wherein the parameter that depends on the distance includes the sound pressure of the second acoustic streaming generating ultrasound on the boundary surface of the model body, the relationship data are data measured by irradiating the model body with the second acoustic streaming generating ultrasound while changing the sound pressure, the second acoustic streaming generating ultrasound having a focal point at a specific position in the model body, the beam diameter of the second acoustic streaming generating ultrasound on the boundary surface of the model body being a specific diameter, and the drive condition is a condition under which the beam diameter of the first acoustic streaming generating ultrasound on the boundary surface of the target region is equal to the specific diameter.

6. An ultrasound diagnostic apparatus comprising:

a drive circuit configured to transmit a drive signal to an ultrasound transducer;

a receiving circuit configured to receive an echo signal from the ultrasound transducer;

a storage configured to store relationship data according to a size of a target region and a parameter that depends on a distance, the relationship data providing a correspondence between a flow velocity of an acoustic streaming being generated in liquid in the target region and a physical property value of the liquid; and a processor configured to:

obtain, based on the echo signal or a user input, target information containing at least one of a distance from the ultrasound transducer to the target region containing the liquid or a size of the target region, and set, based on the target information, a drive condition under which an acoustic streaming generating ultrasound transmitted by the ultrasound transducer generates the acoustic streaming in the liquid in the target region;

control the drive circuit such that the drive signal based on the drive condition is transmitted to the ultrasound transducer;

calculate the flow velocity of the liquid by analyzing the echo signal at a time of the acoustic streaming being generated in the liquid; and obtain the relationship data corresponding to the target information including the size of the target region from the storage, and estimate the physical property value by referencing the relationship data based on the flow velocity, wherein the storage stores the relationship data further according to a shape of the target region, the relationship data providing the correspondence between the flow velocity and the physical property value, and the processor is configured to:

generate an ultrasound image based on the echo signal;

cause the shape of the target region on the ultrasound image to be approximated as an ellipse, and calculates a position of a major axis of the ellipse; and set the drive condition under which a line indicating a transmission direction of the acoustic streaming generating ultrasound is superposed on the position of the major axis.

7. The ultrasound diagnostic apparatus according to claim 6, wherein the size of the target region is expressed by a first parameter indicating a size of the ellipse, the shape of the target region is expressed by a second parameter indicating a flattened shape of the ellipse, and the storage stores the relationship data according to the first parameter, the second parameter, and the parameter that depends on the distance, the relationship data providing the correspondence between the flow velocity and the physical property value.

8. The ultrasound diagnostic apparatus according to claim 6, wherein based on the echo signal, the processor is configured to generate the ultrasound image where a marker indicating the position of the major axis is superposed on a marker indicating the transmission direction of the acoustic streaming generating ultrasound.

9. An ultrasound diagnostic apparatus comprising:

a drive circuit configured to transmit a drive signal to an ultrasound transducer;

a receiving circuit configured to receive an echo signal from the ultrasound transducer;

a storage configured to store relationship data providing a correspondence between a flow velocity of an acoustic streaming being generated in liquid in model bodies and a physical property value, the relationship data being data measured by transmitting an acoustic streaming generating ultrasound with predetermined irradiation condition to the model bodies changing a distance, the model bodies being obtained by modelling a target region, and having different sizes and different physical property values, and the processor is configured to:

obtain, based on the echo signal or a user input, target information containing at least one of a distance from the ultrasound transducer to the target region containing the liquid or a the size of the target region, and set, based on the target information, a drive condition under which the acoustic streaming generating ultrasound transmitted by the ultrasound transducer generates the acoustic streaming in the liquid in the target region;

control the drive circuit such that the drive signal based on the drive condition is transmitted to the ultrasound transducer;

calculate a flow velocity of the liquid by analyzing the echo signal at a time of the acoustic streaming being generated in the liquid; and obtain the relationship data corresponding to the target information from the storage and estimate the physical property value by referencing the relationship data based on the flow velocity.

10. The ultrasound diagnostic apparatus according to claim 9, wherein the predetermined irradiation condition is a condition under which an intensity and an opening diameter of the third acoustic streaming generating ultrasound take constant values.

11. An ultrasound diagnostic system comprising:

an ultrasound diagnostic apparatus;

an ultrasound transducer connected to the ultrasound diagnostic apparatus, and a storage configured to store relationship data according to a size of a target region and a parameter that depends on a distance, the relationship data providing a correspondence between a flow velocity and a physical property value, wherein the ultrasound diagnostic apparatus includes a drive circuit configured to transmit a drive signal to the ultrasound transducer, a receiving circuit configured to receive an echo signal from the ultrasound transducer, and a processor configured to:

obtain, based on the echo signal or a user input, target information containing at least one of a distance from the ultrasound transducer to a target region containing liquid or a size of the target region; and set, based on the target information, a drive condition under which an acoustic streaming generating ultrasound transmitted by the ultrasound transducer generates acoustic streaming in the liquid in the target region;

wherein the processor is further configured to:

control the drive circuit such that the drive signal based on the drive condition is transmitted to the ultrasound transducer;

calculate a flow velocity of the liquid by analyzing the echo signal at a time of the acoustic streaming being generated in the liquid;

estimate a physical property value according to the flow velocity, the physical property value correlating with a viscosity of the liquid;

obtain the target information further containing the size of the target region based on the echo signal or the user input; and obtain the relationship data corresponding to the target information from the storage, and estimate the physical property value by referencing the relationship data based on the flow velocity;

wherein the storage stores the relationship data further according to a shape of the target region, the relationship data providing the correspondence between the flow velocity and the physical property value, and the processor is further configured to:

generate an ultrasound image based on the echo signal;

cause the shape of the target region on the ultrasound image to be approximated as an ellipse, and calculates a position of a major axis of the ellipse; and set the drive condition under which a line indicating a transmission direction of the acoustic streaming generating ultrasound is superposed on the position of the major axis.

12. The ultrasound diagnostic system according to claim 11, wherein the processor is configured to control the drive circuit such that the ultrasound transducer obtains the target information and transmit a measurement ultrasound to estimate a physical property value, and the ultrasound transducer performs transmission of the measurement ultrasound and transmission of the acoustic streaming generating ultrasound in a time division manner.

13. The ultrasound diagnostic system according to claim 11, wherein the processor is configured to control the drive circuit such that the ultrasound transducer obtains the target information and transmit a measurement ultrasound to estimate a physical property value, the ultrasound transducer includes a first ultrasound transducer configured to transmit the measurement ultrasound, and a second ultrasound transducer configured to transmit the acoustic streaming generating ultrasound, and transmission of the measurement ultrasound by the first ultrasound transducer and transmission of the acoustic streaming generating ultrasound by the second ultrasound transducer are performed simultaneously.

14. A recording medium which is a non-transitory recording medium configured to record a processing program that causes a computer to perform processing, the non-transitory recording medium being capable of being read by the computer, wherein the recording medium records the processing program for transmitting a drive signal to an ultrasound transducer, receiving an echo signal from the ultrasound transducer, obtaining, based on the echo signal or a user input, target information containing at least one of a distance from the ultrasound transducer to a target region containing liquid or a size of the target region, and setting, based on the target information, a drive condition under which an acoustic streaming generating ultrasound transmitted by the ultrasound transducer generates acoustic streaming in the liquid in the target region;

control a drive circuit such that a drive signal based on a drive condition is transmitted to the ultrasound transducer;

calculate a flow velocity of the liquid by analyzing the echo signal at a time of the acoustic streaming being generated in the liquid;

estimate a physical property value according to the flow velocity, the physical property value correlating with a viscosity of the liquid;

obtain the target information further containing a size of the target region based on the echo signal or the user input;

obtain the relationship data corresponding to the target information from a storage, and estimate the physical property value by referencing the relationship data based on the flow velocity;

generate an ultrasound image based on the echo signal;

cause the shape of the target region on the ultrasound image to be approximated as an ellipse, and calculate a position of a major axis of the ellipse; and set the drive condition under which a line indicating a transmission direction of the acoustic streaming generating ultrasound is superposed on the position of the major axis.

15. A method for actuating an ultrasound diagnostic apparatus, the method comprising:

transmitting a drive signal to an ultrasound transducer;

receiving an echo signal from the ultrasound transducer;

obtaining, based on the echo signal or a user input, target information containing at least one of a distance from the ultrasound transducer to a target region containing liquid or a size of the target region; and setting, based on the target information, a drive condition under which an acoustic streaming generating ultrasound transmitted by the ultrasound transducer generates acoustic streaming in the liquid in the target region;

controlling a drive circuit such that a drive signal based on a drive condition is transmitted to the ultrasound transducer;

calculating a flow velocity of the liquid by analyzing the echo signal at a time of the acoustic streaming being generated in the liquid;

estimating a physical property value according to the flow velocity, the physical property value correlating with a viscosity of the liquid;

obtaining the target information further containing a size of the target region based on the echo signal or the user input;

obtaining the relationship data corresponding to the target information from a storage, and estimate the physical property value by referencing the relationship data based on the flow velocity;

generating an ultrasound image based on the echo signal;

causing the shape of the target region on the ultrasound image to be approximated as an ellipse, and calculating a position of a major axis of the ellipse; and setting the drive condition under which a line indicating a transmission direction of the acoustic streaming generating ultrasound is superposed on the position of the major axis.

16. An ultrasound diagnostic system comprising:

an ultrasound diagnostic apparatus;

an ultrasound transducer connected to the ultrasound diagnostic apparatus, and a storage configured to store relationship data according to a size of a target region and a parameter that depends on a distance, the relationship data providing a correspondence between a flow velocity and a physical property value, wherein the ultrasound diagnostic apparatus includes a drive circuit configured to transmit a drive signal to the ultrasound transducer, a receiving circuit configured to receive an echo signal from the ultrasound transducer, and a processor, and the processor is configured to:

obtain, based on the echo signal or a user input, target information containing at least one of a distance from the ultrasound transducer to a target region containing liquid or a size of the target region; and set, based on the target information, a drive condition under which a first acoustic streaming generating ultrasound transmitted by the ultrasound transducer generates acoustic streaming in the liquid in the target region;

wherein the processor is further configured to:

control the drive circuit such that the drive signal based on the drive condition is transmitted to the ultrasound transducer;

calculate a flow velocity of the liquid by analyzing the echo signal at a time of the acoustic streaming being generated in the liquid;

estimate a physical property value according to the flow velocity, the physical property value correlating with a viscosity of the liquid;

obtain the target information further containing the size of the target region based on the echo signal or the user input; and obtain the relationship data corresponding to the target information from the storage, and estimate the physical property value by referencing the relationship data based on the flow velocity;

wherein the relationship data are data measured by irradiating boundary surfaces of a plurality model bodies with second acoustic streaming generating ultrasound having specific irradiation condition, the model body being obtained by modelling the target region, and having different sizes and different physical property value, and the processor is configured to set the drive condition under which the first acoustic streaming generating ultrasound on the boundary surface of the target region coincide with the second acoustic streaming generating ultrasound.

17. The ultrasound diagnostic system according to claim 16, wherein the processor is configured to control the drive circuit such that the ultrasound transducer obtains the target information and transmit a measurement ultrasound to estimate a physical property value, and the ultrasound transducer performs transmission of the measurement ultrasound and transmission of the first acoustic streaming generating ultrasound in a time division manner.

18. The ultrasound diagnostic system according to claim 16, wherein the processor is configured to control the drive circuit such that the ultrasound transducer obtains the target information and transmit a measurement ultrasound to estimate a physical property value, the ultrasound transducer includes a first ultrasound transducer configured to transmit the measurement ultrasound, and a second ultrasound transducer configured to transmit the first acoustic streaming generating ultrasound, and transmission of the measurement ultrasound by the first ultrasound transducer and transmission of the first acoustic streaming generating ultrasound by the second ultrasound transducer are performed simultaneously.

19. A recording medium which is a non-transitory recording medium configured to record a processing program that causes a computer to perform processing, the non-transitory recording medium being capable of being read by the computer, wherein the recording medium records the processing program for transmitting a drive signal to an ultrasound transducer, receiving an echo signal from the ultrasound transducer, obtaining, based on the echo signal or a user input, target information containing at least one of a distance from the ultrasound transducer to a target region containing liquid or a size of the target region, and setting, based on the target information, a drive condition under which an acoustic streaming generating ultrasound transmitted by the ultrasound transducer generates acoustic streaming in the liquid in the target region;

controlling a drive circuit such that a drive signal based on a drive condition is transmitted to the ultrasound transducer;

calculating a flow velocity of the liquid by analyzing the echo signal at a time of the acoustic streaming being generated in the liquid;

estimating a physical property value according to the flow velocity, the physical property value correlating with a viscosity of the liquid;

obtaining the target information further containing a size of the target region based on the echo signal or the user input;

obtaining the relationship data corresponding to the target information from a storage, and estimate the physical property value by referencing the relationship data based on the flow velocity, the relationship data are data measured by irradiating a boundary surface of a model body in plurality with a second acoustic streaming generating ultrasound having a specific irradiation condition, the model body being obtained by modelling the target region, and having a different size and a different physical property value, and setting the drive condition under which the first acoustic streaming generating ultrasound on the boundary surface of the target region agrees with the second acoustic streaming generating ultrasound.

20. A method for actuating an ultrasound diagnostic apparatus, the method comprising:

transmitting a drive signal to an ultrasound transducer;

receiving an echo signal from the ultrasound transducer;

obtaining, based on the echo signal or a user input, target information containing at least one of a distance from the ultrasound transducer to a target region containing liquid or a size of the target region; and setting, based on the target information, a drive condition under which an acoustic streaming generating ultrasound transmitted by the ultrasound transducer generates acoustic streaming in the liquid in the target region;

controlling a drive circuit such that a drive signal based on a drive condition is transmitted to the ultrasound transducer;

calculating a flow velocity of the liquid by analyzing the echo signal at a time of the acoustic streaming being generated in the liquid;

estimating a physical property value according to the flow velocity, the physical property value correlating with a viscosity of the liquid;

obtaining the target information further containing a size of the target region based on the echo signal or the user input;

obtaining the relationship data corresponding to the target information from a storage, and estimate the physical property value by referencing the relationship data based on the flow velocity, the relationship data are data measured by irradiating a boundary surface of a model body in plurality with a second acoustic streaming generating ultrasound having a specific irradiation condition, the model body being obtained by modelling the target region, and having a different size and a different physical property value, and setting the drive condition under which the first acoustic streaming generating ultrasound on the boundary surface of the target region agrees with the second acoustic streaming generating ultrasound.

* * * * *